US007289933B2

(12) United States Patent
Luo et al.

(10) Patent No.: US 7,289,933 B2
(45) Date of Patent: Oct. 30, 2007

(54) SIMULATING TOPOGRAPHY OF A CONDUCTIVE MATERIAL IN A SEMICONDUCTOR WAFER

(75) Inventors: Jianfeng Luo, Fremont, CA (US); Qing Su, Sunnyvale, CA (US); Charles Chiang, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 2 days.

(21) Appl. No.: 11/267,776

(22) Filed: Nov. 4, 2005

(65) Prior Publication Data

US 2007/0118320 A1 May 24, 2007

(51) Int. Cl.
*G01B 11/24* (2006.01)
*H01L 21/31* (2006.01)
(52) U.S. Cl. .................... 702/167; 438/780
(58) Field of Classification Search .......... 702/65, 702/81, 82, 83, 84, 166, 170, 167; 438/14, 438/17, 694–780, 623
See application file for complete search history.

(56) References Cited

U.S. PATENT DOCUMENTS

2004/0058255 A1* 3/2004 Jessen et al. .............. 430/30
2005/0146714 A1* 7/2005 Kitamura et al. ........ 356/237.2

OTHER PUBLICATIONS

S. Wolf, *Silicon Processing for VLSI Eta*, vol. 4; *Deep Submicron Process Technology*, Lattice Press, Sunset Beach, CA, USA, Dec. 2002, (all pages1-204).

Z. Stavreva, D. Zeidler, M. Plotner, G. Grasshoff and K. Drescher, "Chemical-mechanical polishing of copper for interconnect formation," *Microelectronic Engineering*, vol. 33, pp. 249-257, 1997, 9 Pages.

L. He, A. B. Kahng, K. Tam and J. Xiong, "Design of IC interconnects with accurate modeling of CMP," *International Society for Optical Engineering (SPIE) Symposium on Microlithograhpy*, Mar. 2005, 11 pages.

V. Mehrotra, "Modeling the effects of systematic process variation on circuit performance," *Ph. D. Dissertation*, Dept. of EECS, MIT, Cambridge, MA, USA, 2001, pp. 1-156.

(Continued)

*Primary Examiner*—John Barlow
*Assistant Examiner*—Victor J. Taylor
(74) *Attorney, Agent, or Firm*—Silicon Valley Patent Group LLP; Omkar Suryadevara

(57) ABSTRACT

A dimension of a conductive material in a semiconductor wafer is determined by a computer that treats as identical (a) volume of the conductive material which is proportional to an effective surface area of sidewalls of an insulative trench and (b) volume of the conductive material derived from geometry based on a predetermined amount by which width of a conductive trench (if present) in the conductive material differs from width of the insulative trench. In some embodiments, the computer computes the effective surface area as the product of trench depth and a layout parameter, either or both of which may be partially or wholly empirically determined from a test wafer containing several topographies. The computer computes the dimension assuming one topography and validates the assumption if a predetermined condition is met. If the condition is not met, the computer re-computes the dimension, assuming another topography.

36 Claims, 15 Drawing Sheets

OTHER PUBLICATIONS

T. H. Park, "Characterization and modeling of pattern dependencies in copper interconnects for integrated circuits," *Ph.D. Dissertation*, Dept. of EECS, MIT, Cambridge, MA, USA, 2002, pp1-204.

M. X. Yang, D. Mao, C. Yu, J. Dukovic and M. Xi, "Sub-100nm interconnects using multistep plating," *Solid State Technology*, Oct. 2003, pp 4 total.

J. Reid, S. Mayer, E. Broadbent, E. Klawuhn and K. Ashtiani, "Factors influencing damascene feature fill using copper PVD and electroplating," *Solid State Technology*, Jul. 2000, pp. 10 total.

T. P. Moffat, D. Wheeler, W. H. Huber and D. Josell, "Superconformal electrodeposition of copper," Electrochemical and Solid-State Letters, vol. 4, pp. C26-C29, 2001.

D. Josell, D. Wheeler, W. H. Huber, J. E. Bonevich and T. P. Moffat, "A simple equation for predicting superconformal electrodeposition in submicrometer trenches," *Journal of the Electrochemical Society*, vol. 148, pp. C767-C773, 2001, 7 pages.

Y. H. Im, M. O. Bloomfield, S. Sen and T. S. Cale, "Modeling pattern density dependent bump formation in copper electrochemical deposition," *Electrochemical and Solid State Letters*, vol. 6, pp. C42-C46, 2003, 5 pages.

"Modeling of Pattern Dependencies in Multi-Step Copper Chemical Mechanical Polishing Processes", Tamba Tugbawa et al., Published in Chemical-Mechanical Planarization for Multilevel Interconnect, Mar. 2001, All Pages, 4 pages, 1-4.

"Wafer-Scale CMP Modeling of With-in Wafer Non-Uniformity" Jianfeng Luo et al., Published in Laboratory for Manufacturing Automation, 2003, All Pages 1-24.

"Characterization and Modeling of Oxide Chemical-Mechanical Polishing Using Planarization Length and Pattern Density Concepts", D. Okumu Ouma et al., Published in IEEE Transactions on Semiconductor Manufacturing, vol. 15, May 2, 2002, All Pages 1-13.

"Chip-Scale Modeling of Pattern Dependencies in Copper Chemical Mechanical Polishing Processes", Tamba E. Gbondo-Tugbawa, Published in Massachusetts Institute of Technology, May 2002, All Pages.

"Review of Chemical-Mechanical Planarization Modeling for Integrated Circuit Fabrication: From Particle Scale to Die and Wafer Scales", Jianfeng Luo, NSF and UC-SMART, believed to be published in 2003 or earlier, all pages 1-23.

"The Chemistry of additives in damascene copper plating" by P. M. Vereecken et al. Published in IBM J. Res & Dev. vol. 49, No. 1, Jan. 2005, All Pages 1-16.

* cited by examiner

SIMULATING TOPOGRAPHY OF A CONDUCTIVE MATERIAL IN A SEMICONDUCTOR WAFER

BACKGROUND

1. Field of the Invention

The invention relates to the design of semiconductor chips. More specifically, the invention relates to a method and an apparatus for simulating topography of a conductive material in a semiconductor wafer after Copper deposition and prior to polishing.

2. Related Art

Electroplating (ECP) and chemical mechanical planarization (CMP) processes have gained broad applications in copper (Cu) interconnect pattern generation in the back end process of sub-130 nm technology nodes. See, S. Wolf, *Silicon Processing for VLSI Era, Vol. 4: Deep Submicron Process Technology*, Lattice Press, Sunset Beach, Calif., USA, 2002. Cu is patterned using a process known as damascene process. During the Cu damascene process, trenches and holes are first etched in the oxide material. An ECP process is applied to deposit the Cu onto the whole wafer filling up the trenches. It is followed by a CMP process in which excess overflowing Cu is removed from the oxide surface leaving Cu in the intended trenches and holes; forming interconnect wires and vias. Depending on whether vias and wires are patterned separately or simultaneously, the Cu patterning process is called single damascene process or double damascene process. See FIG. 1.

The Cu and oxide thickness after the damascene process is not uniform across the whole chip. Instead, systematic Cu and oxide thickness variations are observed. These systematic variations are found to be layout dependent. For example, when Cu wire width is changed from 0.9 μm to 100 μm, a >100 nm variation in the Cu thickness is observed. See Z. Stavreva, D. Zeidler, M. Plotner, G. Grasshoff and K. Drescher, "Chemical-mechanical polishing of copper for interconnect formation," *Microelectronic Engineering*, Vol. 33, pp. 249-257, 1997. This thickness variation is around 20% for the nominal wire thickness of 550 nm. As feature size scales down, these systematic variations are gaining more significance.

The inventors of the current patent application believe that modeling of the post-CMP Cu and oxide thickness variation in the deep submicron era is critical for the following three reasons. First is the stringent depth of focus (DOF) requirements of the lithography process. With the lithography wavelength stuck at 193 nm and not keeping up with technology scaling, the DOF budget of the lithography tools has been reduced to several hundred nanometers (200~400 nm). This stringent DOF requirement dictates that the CMP process generates a surface with thickness variation less than 100 nm. Thus it is crucial that one be able to predict oxide and metal thickness variation after CMP with topography modeling and simulation. Second is the need to compare and evaluate the impact of different yield improvement methods. For example, in order to evaluate and compare the topography uniformity improvements resulting from different dummy-fill patterns, a topography model is needed to simulate the resulting thickness variation of each pattern. Third is the need to analyze the impact of the post-CMP thickness variations on timing. Cu and oxide thickness variations result in wire resistance and capacitance variations; which in turn impact the timing of a path in a chip. L. He, A. B. Kahng, K. Tam and J. xiong, "Design of IC interconnects with accurate modeling of CMP," *International Society for Optical Engineering (SPIE) Symposium on Microlithograhpy*, March, 2005; see also V. Mehrotra, "Modeling the effects of systematic process variation on circuit performance," *Ph. D. Dissertation*, Dept. of EECS, MIT, Cambridge, Mass., USA, 2001.

Topography modeling can help the designer in evaluating interconnect parasitic variations. To model the post-CMP Cu and oxide thickness variations accurately, a model to predict the post-ECP topography is first needed. The post-ECP topography strongly depends on layout patterns, as shown in FIG. 2A. One of the first ECP models to show this dependency is the one proposed by Park. See T. H. Park, "Characterization and modeling of pattern dependencies in copper interconnects for integrated circuits," *Ph.D. Dissertation, Dept. of EECS*, MIT, Cambridge, Mass., USA, 2002. In Park's model, the two variables that represent the topography: array height H and step height S, are modeled by two separate polynomials that are independent of each other. The two variables H and S are shown in FIG. 2A. The two polynomials are extracted and calibrated with measured data from test structures. Park's model uses the following formulae for a repeating line/space structure of the type shown in FIG. 2B:

$$H_1 = a_A(LW) + b_A(LW)^{-1} + c_A(LW)^{-2} + d_A(LS) + e_A(LW \cdot LS) + \text{Const}_A$$

$$S = a_S(LW) + b_S(LW)^{-1} + c_S(LW)^2 + d_S(LS) + e_S(LW \cdot LS) + \text{Const}_S$$

wherein $H_1$ is the copper thickness over oxide, and S is step height, and LW is width of a copper wire and LS is spacing between two adjacent copper wires.

The current inventors note that there are several potential problems with Park's model. First, due to failure to consider the physics involved in the ECP process, Park's model does not capture any physical interaction between $H_1$ and S. Therefore, two separate polynomials (as shown above) are used by Park to model these variables. Moreover, Park's model requires use of ten calibration parameters, five for the $H_1$ and five for the step height S (respectively labeled a-e in the above equations). The lack of physical insight into the calibration parameters in Park's model potentially leads to over-fitting.

Second, the empirical model for topography is formulated by Park's model as a function of wire width LW and spacing LS. Current inventors further note that Park's model is sufficient for regular layout patterns in test structures because the values for wire width and spacing are usually the same. However, for practical designs, in any given layout region, various features in various objects are likely to have different widths and spacings. Therefore, using a single set of width and spacing values to represent an entire layout in a window greatly degrades the accuracy of Park's model. Third, in Park's model, the impact of layout patterns on topography is quite local. However, current inventors note that an interaction distance of 20~50 μm has been observed from experiments. See, for example, M. X. Yang, D. Mao, C. Yu, J. Dukovic and M. Xi, "Sub-100 nm interconnects using multistep plating," *Solid State Technology*, Oct., 2003. Hence, Park's calculation of topography based on the wire width and spacing at a feature's location may not be accurate in the first place.

FIG. 3 shows a simplified drawing of a copper electroplating system of the type being modeled by Park. A wafer coated with a thin electrically conductive layer of seed Cu is immersed in chemical solutions containing Cu ions. An external power source is then connected between the seed Cu on the wafer surface and the solid Cu, which act as a cathode and an anode respectively. The Cu ions in the solutions react with the electrons to form Cu on the wafer where the current is passed through. This can be described by the following equation: $Cu^{2+}+2e^-=Cu$. The copper ions depleted from the chemical solution will be replenished from the solid copper anode.

A major challenge for the conventional ECP process in the sub-micron era is to fill up the high-aspect-ratio sub-micron trenches with no voids. A void is defined as a hole inside a Cu or a filling material. Presence of a void may cause an open circuit. The primary reason for void formation is a faster deposition rate at the neck of the trench than at its bottom. Therefore, void formation may be avoided by appropriately adjusting the local deposition rate. The current state of art copper electroplating process to prevent void formation is a bottom-up fill process where the deposition starts at the bottom of the trench and move upwards. To achieve such a bottom fill behavior, additive chemicals known as accelerators, suppressors, and levels are typically added to the plating solution. They are adsorbed on the wafer surface to either accelerate or suppress the local deposition rates.

Park does not model the role and interactions of accelerators, suppressors and levels in the bottom-up fill behavior. Current inventors note that others have proposed several theories to explain the bottom-filling behavior. One of the most successful theories is an additive accumulation theory proposed by Reid et al. See J. Reid, S. Mayer, E. Broadbent, E. Klawuhn and K. Ashtiani, "Factors influencing damascene feature fill using copper PVD and electroplating," *Solid State Technology*, July, 2000. An illustration of additives behavior based on this theory is shown in FIGS. 4A-4G for a single trench and is described as follows: Once a wafer with a seed layer deposited is immersed in the plating solution (FIG. 4A), bath additives are adsorbed on the Cu seed surface, and an equilibrium level of additives is on all surfaces of the wafer, including both the side walls and the top and bottom of the trench (e.g. as shown in FIG. 4B at a time t=2 sec.). Due to the equilibrium level of chemical additives, once the current is applied on the solution bath, a conformal plating process will start first (t=10 sec., see FIG. 4C). After a certain amount of time (t=20 sec., see FIG. 4D), the accelerators, which can neither be incorporated into the deposited Cu surface, nor be desorbed into the plating solution, start to move to the bottom of the trench. The suppressors will be displaced by the accelerators due to their weaker adsorbing ability. This leads to a high concentration of accelerators on the bottom of the trench (t=30 sec, see FIG. 4E). Therefore the deposition rate on bottom is faster than on the sidewall and neck, making the deposition void free. The final surface may be planar (t=60 sec, see FIG. 4F) or have a bump (t=60 sec, see FIG. 4G) depending on the presence or absence of levelers and/or desorption of accelerators.

The above explanation, in paragraph [0010], of the superfill mechanism has been proved to be successful and is adopted by several complicated numerical models, although not by Park. See T. P. Moffat, D. Wheeler, W. H. Huber and D. Josell, "Superconformal electrodeposition of copper," *Electrochemical and Solid-State Letters*, Vol. 4, pp. C26-C29, 2001; D. Josell, D. Wheeler, W. H. Huber, J. E. Bonevich and T. P. Moffat, "A simple equation for predicting superconformal electrodeposition in submicrometer trenches," *Journal of the Electrochemical Society*, Vol. 148, pp. C767-C773, 2001; and Y. H. Im, M. O. Bloomfield, S. Sen and T. S. Cale, "Modeling pattern density dependent bump formation in copper electrochemical deposition," *Electrochemical and Solid State Letters*, Vol. 6, pp. C42-C46, 2003.

Current inventors have realized that one of the key ideas in the model described in paragraph [0010] is that there is no consumption of accelerators during ECP. The deposition rate increases with the amount of the accelerators in the trenches, which is determined by not only the area of the trench bottom but also by the area of the trench sidewall. For finer trenches with the same sidewall area, a faster deposition rate is expected due to a higher concentration of accelerators. Such an effect of accelerators is not taken into account by Park.

SUMMARY

A computer is programmed, in certain embodiments of the invention, to automatically compute a vertical dimension (such as height) of a conductive material in a current region of a layout (that is subdivided into a number of regions including the current region) of a semiconductor wafer by treating as same (either approximately or exactly) two volumes: (a) volume of the conductive material which is proportional to an effective surface area of sidewalls of an insulative trench and (b) volume of the conductive material derived from geometry based on a predetermined amount by which a feature in the conductive material differs in width from a corresponding feature in the insulative layer. Note that the sidewalls' surface area is herein called "effective" to distinguish it from the sidewall's nominal surface area. An estimate of the sidewall's effective surface area is made (from one or more measurements on a test wafer), to account for different concentrations of accelerators at different locations on the sidewalls. Such an effective surface area is used in computing the vertical dimension, directly or indirectly to obtain an indication of the volume of conductive material that will be added in the current region.

Depending on the embodiment, the effective surface area may be determined empirically (in whole or in part) as follows. A test wafer is fabricated to contain each of several different topographies (such as an insulative trench over which a conductive bump or alternatively a conductive trench is formed) that are likely to occur in the semiconductor wafer, using the same process that is to be used for the semiconductor wafer. Different topographies may result in different regions of the test wafer, depending on, for example, differences in layout density and/or perimeter. Next, measurements are made of the vertical dimension in each of the topographies, by use of a profiler such as high resolution profiler (HPF) and atomic force microscope (AFM) or scanning electron microscope or SEM. The vertical dimension's measurements are then used in calibration of one or more unknowns (such as effective trench depth and/or shrinkage amount and/or expansion amount) in a formula for the vertical dimension obtained by equating volumes (a) and (b) described above.

In some embodiments, the computer is programmed to compute (explicitly or implicitly) the insulative trench sidewalls' effective surface area in a current region as the product of (1) trench depth and (2) a parameter of the layout either or both of which may be partially or wholly determined empirically from the test wafer, e.g. as one of the unknowns described above. Examples of the layout parameter include: (1) perimeter of trenches in the layout (2) area density of the layout, (3) sum of diagonal lengths of trenches in the layout, and (4) line width and space. While several embodiments explicitly compute sidewalls' surface area which is then used to compute the vertical dimension, other embodiments directly compute the vertical dimension by using the calibrated unknowns and a formula obtained by equating volumes (a) and (b) as described above.

Depending on the embodiment, the computer computes as a candidate for the vertical dimension, a step height and/or array height assuming one topography (e.g. with the conductive material having a trench) and if a predetermined condition is met the candidate is reported in a topography of the wafer in the region. If the predetermined condition is not met, the candidate is discarded and the computer is further programmed to re-compute another candidate for the dimension, assuming another topography (e.g. with the conductive material having a bump or a flat surface). While in some embodiments the predetermined condition checks the computed dimension itself (e.g. step height >0), in other embodiments, one or more intermediate results (of computing the vertical dimension) are checked while still other embodiments check other parameters such as a re-sized density of the layout.

Trying out different topographies by computing one or more candidates depending on whether or not one or more predetermined conditions are being satisfied as described above, and the consequent use of two (or more) different formulae to compute the same dimension for different topographies ensures a better fit of the reported topography to observed experimental values than prior art methods that use common formulae in all regions of the semiconductor wafer, independent of topography.

Many embodiments of the invention include making, using and/or selling an article of manufacture in the form of a computer-readable medium (such as a memory or a carrier signal) that is encoded with at least the following two results for each of several regions (into which a layout is subdivided), namely layout parameters (e.g. perimeter, layout density) of the type described in paragraph [0015] and computer instructions to compute a vertical dimension of the type described in paragraph [0016]. In a few such embodiments, the computer-readable medium is encoded with multiple vertical dimensions (for each region), e.g. array height and/or step height.

DETAILED DESCRIPTION

A computer, when appropriately programmed in accordance with the invention, determines topography (e.g. topography type and/or vertical dimension) of a conductive material in a semiconductor wafer using a layout parameter (e.g. perimeter L of sidewalls in a current region of the layout), based on the principle that volume of the conductive material is proportional to surface area. Specifically, if a current region (which is one of several regions into which the layout is subdivided) has a trench, then the surface area is determined by three areas, namely a bottom area of the trench, a top area in the region surrounding a neck of the trench, and an area of the trench's sidewalls. Note that the top area and the bottom area when added, form the total area of the layout, within the current region. Hence, it is the third area, namely an effective area of the trench's sidewalls (determined by use of at least one measurement from a test wafer), which is therefore used by the programmed computer to determine topography in accordance with the invention. While some embodiments of the computer determines the topography by computing an array height and a step height, other embodiments use other terms to define such a vertical dimension, for example, Cu thickness=array height−step height, Cu thickness=array height−field Cu thickness.

In several embodiments of the invention, a nominal perimeter L is computed as the sum of perimeters of all objects in a region of the layout. Such embodiments may compute the perimeter as follows, for an exemplary layout in a region of size D×D illustrated in FIG. 5:

$$L=2(L_1+L_2+L_3+L_4+L_7+L_8+L_6)+L_9+L_{10}+L_5$$

Figure 5A:
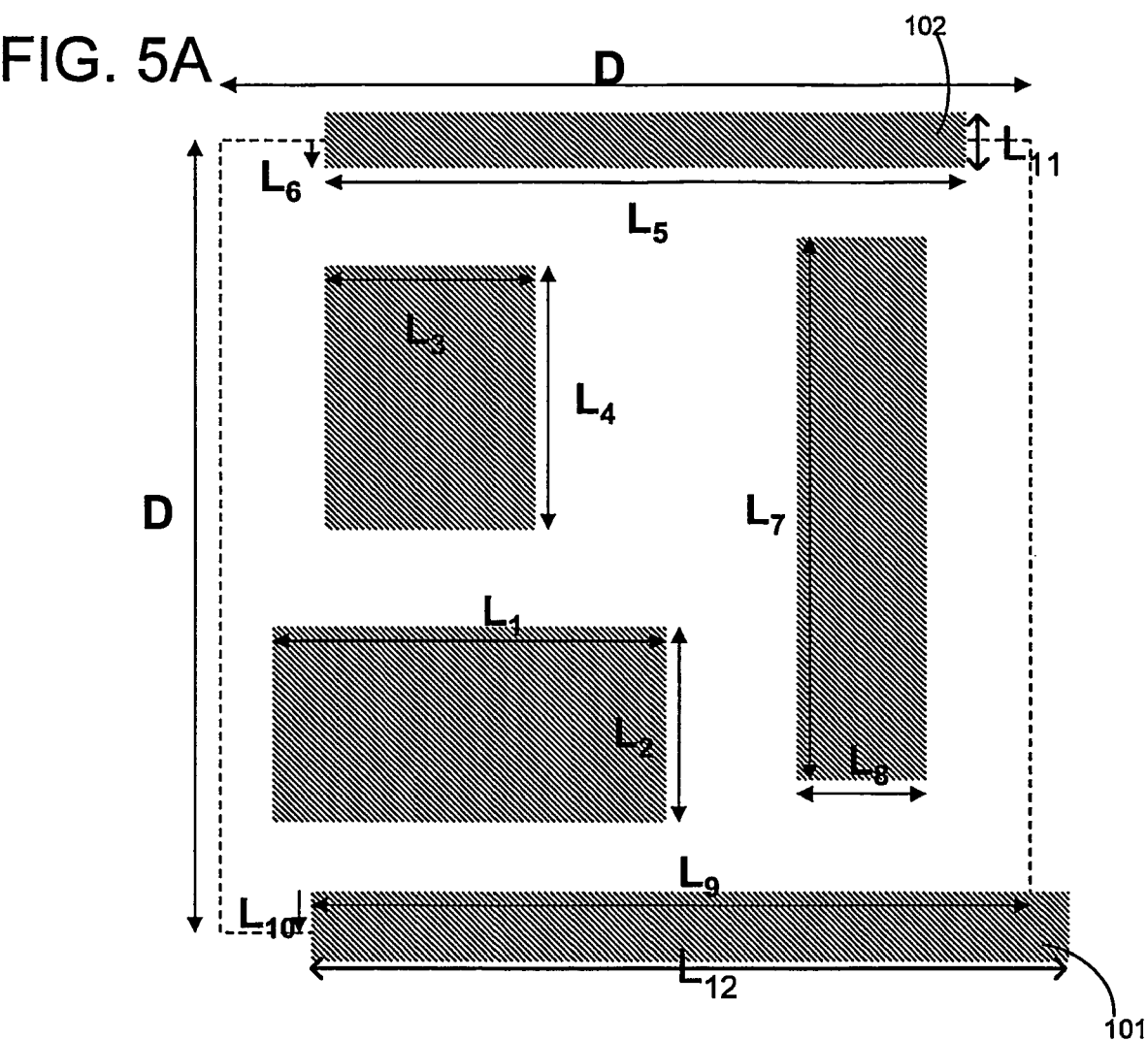
FIG. 5A illustrates computation of perimeter of an arbitrary layout in a region of size D×D in accordance with some embodiments of the invention.

Note that for objects crossing the boundaries of a current region (to one or more adjacent regions), only a portion of the perimeter that is inside a current region is included in the above formula. Specifically, as shown in FIG. 5A, although wire 102 (in FIG. 5A) has an actual width $L_{11}$, only width $L_6$ which is within the D×D region is used in the perimeter computation. Similarly, although wire 101 (in FIG. 5A) has an actual length $L_{12}$, only length $L_9$ is used in the above formula.

Some embodiments multiply the perimeter L with an effective trench depth that is experimentally determined, to automatically compute the effective surface area that is then used to compute a dimension of the conductive material in a direction of thickness of the semiconductor wafer. Note that while some embodiments use layout perimeter L to relate the layout to the surface area, other embodiments use other layout parameters such as diagonal line length, area, line width and spacing to calculate the surface area, as will be apparent to the skilled artisan in view of this disclosure. Hence, the vertical dimension that is being computed may be, for example, a height, such as array height H, or step height S. Note that array height H as used herein denotes H0+H1 for the fine-line-fine-space structure shown at the left of FIG. 2A and height H denotes H0−H1 for the large-line-fine-space structure shown at the right of FIG. 2A.

Hence, array height H is hereinafter used to mean thickness of the conductive material above the non-conductive layer in the semiconductor wafer after the conductive material has been added thereon (see FIG. 6A-6D). Moreover, step height S is hereinafter used to mean the difference between the height of the conductive material (such as copper) above the insulative material (such as oxide) and the height of the conductive material above the trench in the insulative material (see FIGS. 6A, 6B and 6D; note that step height S is zero in FIG. 6C). Use of perimeter L is not limited to effective surface area computation, and instead the inventors believe that several different embodiments of the invention may use perimeter L in several different ways (e.g. based on formulae and/or empirical data of various kinds) to determine the array height H, and/or step height S.

Furthermore, depending on the embodiment, the just-described two heights may be computed in any order relative to one another. For example, some embodiments first compute the step height S based on perimeter L and then use the computed step height S to compute the array height H, while other embodiments do the reverse. Furthermore, certain embodiments determine each of step height S and array height H, using the perimeter L twice, once for each height. In all such embodiments, when the height of the conductive material above the insulative material is larger than the height of the conductive material above the trench in the insulative material, the step height S that is generated has a positive value. Otherwise, step height S has a negative value.

Figure 1:
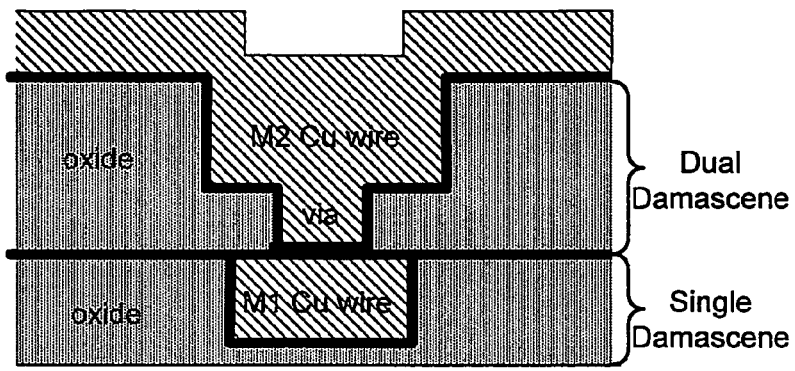
FIG. 1 shows, in a cross-sectional view through a semiconductor wafer, a structure that is produced by a copper damascene process well known in the prior art.
Figure 2A:
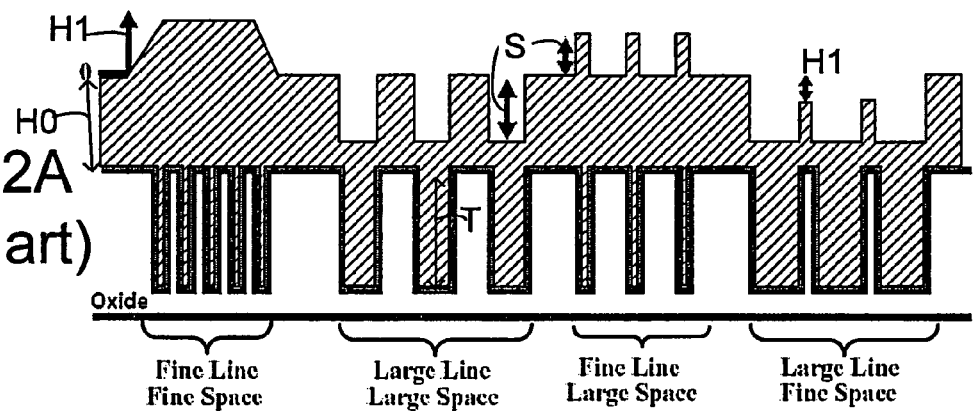
FIG. 2A shows, in a cross-sectional view, a prior art topography of copper (Cu) on a semiconductor wafer, after ECP process, as disclosed by Park.

In the following description of certain embodiments, the term "insulative trench" is hereinafter used to mean a trench in an insulative material, such as an oxide. An insulative trench is eventually filled with a conductive material that may form a wire and/or via after polishing by a CMP process. Therefore, the width of an insulative trench is the same as the width of a wire. The depth of the insulative trench is denoted as T as shown in FIG. 2A. In some embodiments, the trench depth includes the barrier thickness for more accurate simulation results. Therefore, depending on the embodiment, T can be insulative trench depth only or insulative trench depth plus barrier thickness.

Figure 6C:
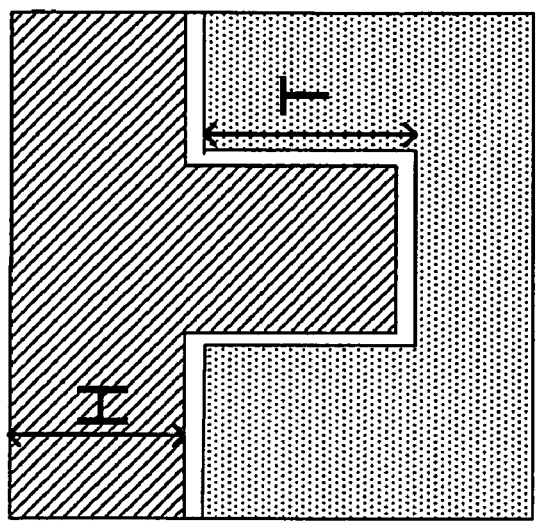
FIGS. 6A-6D illustrate four different topography types of a conductive material over an insulative trench that are identified by an appropriately programmed computer in some embodiments of the invention.
Figure 6B:
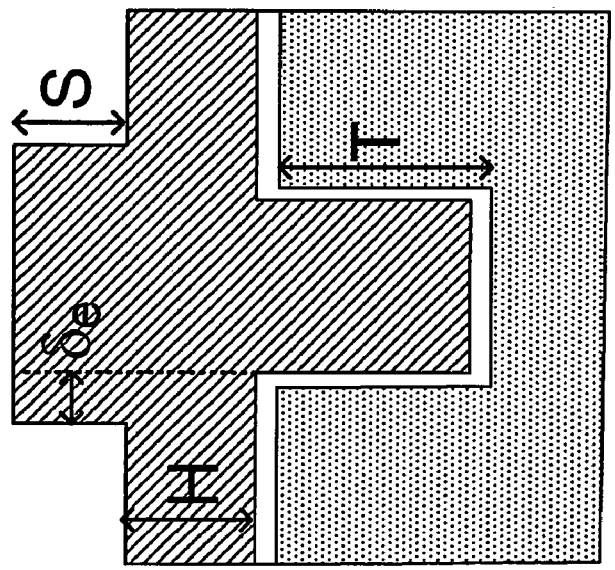
Figure 6A:
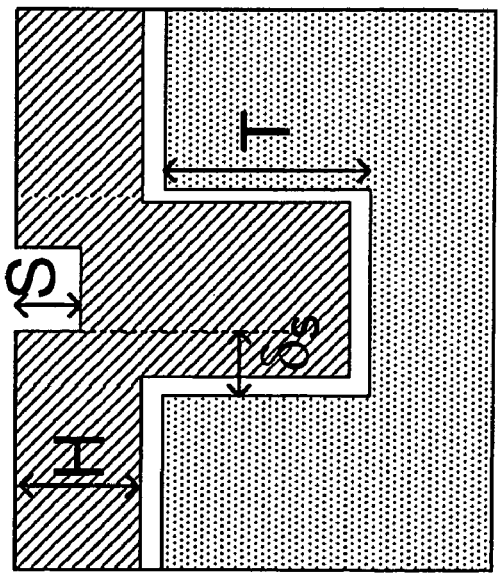

When step height S is positive, a trench (also called "conductive trench") is formed in the conductive material, at a location above the insulative trench, as illustrated in FIG. 6A. In the structure illustrated in FIG. 6A, the conductive material above the insulative layer is higher than that above the trench, and hence step height S is positive. In addition, the conductive trench's width is smaller than the insulative trench's width by a shrinkage amount δs, as shown in FIG. 6A. This type of topography, which has a conductive trench as illustrated in FIG. 6A results from a process commonly known as conformal fill, and is referred to below as "case 1."

Figure 6D:
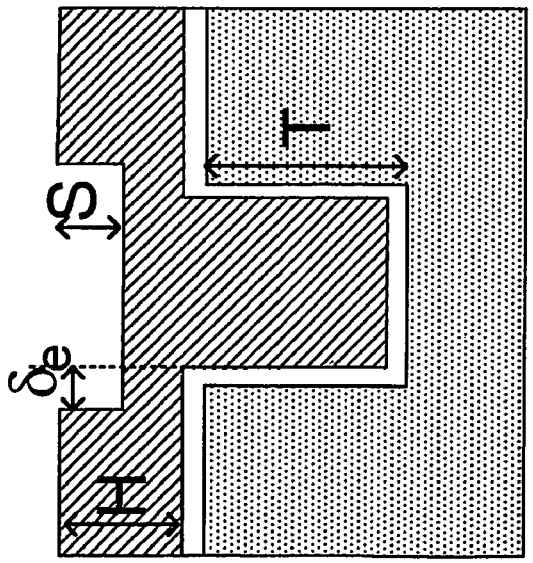

When the step height S is negative, a bump is formed in the conductive layer above the insulative trench, as illustrated in FIG. 6B. In the topography type illustrated in FIG. 6B, the conductive material above the insulative trench is wider than the insulative trench's width by an expansion amount δe. This is a differentiating property between topographies of this type (called "case 2"), and the topography types of case 1 described in the previous paragraph. Note that step height S can be either positive or negative in case 2 as discussed below. FIG. 6B only illustrates the case of a negative step height S for simplicity. The structure of FIG. 6B results from a process which is commonly known as super fill. A topography type for case 2 with positive step height is illustrated in FIG. 6D.

When step height S is zero, a flat surface is formed as the top surface of the conductive layer, as illustrated in FIG. 6C. For clarity, FIGS. 6A-6C show the three types of topographies for only a single wire. However, this description of topography types is equally applicable to multiple wire topographies as well. Moreover, the following description is only for certain exemplary embodiments of the invention wherein the conductive material used is copper and the insulative material is oxide, although this description is believed to be similarly applicable to embodiments that model other conductive and/or insulative materials.

Besides perimeter sum L, the layout density $\rho$, and the topography density $\rho_d$ are other similar layout-related parameters that can also be used in a similar manner in accordance with the invention. The nominal layout density $\rho$ is defined as the area of all the objects (e.g. features, trenches) in a region in a layout in a wafer's design, divided by the total area of the region. The nominal layout density $\rho$ is also referred to as metal density. Another density $\rho_d$ (also called "topography density") is defined as the ratio of the area of the lower regions of the deposited Cu to the total area of the region. Several embodiments of the invention use topography density $\rho_d$ of the structure that results after addition of conductive material, as shown in FIGS. 6A-6D for the four cases as follows:

$$\begin{cases} \rho_d = \rho_s & \text{case (1)}; \\ \rho_d = 1 - \rho_e & \text{case (2)}, S < 0; \\ \rho_d = \rho_e & \text{case (2)}, S > 0; \\ \rho_d = 1 & \text{case (3)}, S = 0. \end{cases} \quad (1)$$

where $\rho_s$ is referred to as the shrunk density for case (1), and can be calculated as the layout density after shrinking all objects in the layout by an amount of $\delta_s$; $\rho_e$ is referred to as the expanded density for case (2), and can be calculated as the layout density after expanding all objects in the layout by an amount of $\delta_e$. These density attributes are used as indicators of deposited copper volume in some embodiments, as discussed below. Note that for shrunk layout, a current region itself is used to calculate the shrunk density, and layout features in the adjacent regions are not considered. For the expansion layout, a layout feature in the adjacent regions is expanded into the given region. In this case, the query region/window is expanded by an amount of the expansion size, to ensure that the features in the adjacent regions are covered.

As noted above, some embodiments treat as identical the volume of Cu after deposition, which is evaluated from two different perspectives: one is from an additive physics perspective, while the other is from a topography geometry perspective. According to the additive physics perspective, the volume of Cu deposited is proportional to the amount of accelerators on the wafer surface:

$$V = \alpha C, \quad (2)$$

where V is the volume of Cu, $\alpha$ is a proportionality coefficient, and C is the amount of accelerators on the surface of the semiconductor wafer. Based on the additive acceleration model the amount of the accelerators C is proportional to the surface area A which is defined as the sum of the oxide area, the trench bottom area, and the trench sidewall area. Therefore, $$C = \beta A \quad (3)$$

where $\beta$ is a proportionality coefficient. For an arbitrary layout in a current region of size D×D as shown in FIG. 5A, the surface area A is formulated as $$A = TL + D^2, \quad (4)$$

where T is the insulative trench's depth (or insulative trench depth plus barrier thickness for more accurate simulation results).

Note that L is the perimeter sum including only the portion of the perimeters that are inside the current region, because only this portion corresponds to the side walls falling in the current region D×D. Note again L could be any other layout parameters that can be used to calculate the surface area as defined before Eq. (3). Other embodiments use other layout parameters to calculate surface area A in Eq. (4) as appropriate.

Considering that the original concentration of the accelerators adsorbed on the sidewall may be smaller than that on the top of the wafer and bottom of the trenches, an effective surface area $A_{\text{eff}}$ can be defined as $$A_{\text{eff}} = T_e L + D^2, \quad (5)$$

where $T_e$ is the effective trench depth, $T_e$ L is the effective surface area of the trench, and $T_e < T$ As noted above, effective trench depth is a calibration/fitting parameter obtained empirically. Note that while in some embodiments, a computer is programmed to compute effective surface area $A_{\text{eff}}$ as formulated in equation (5), other embodiments may use other formulations of effective surface area $A_{\text{eff}}$. For instance, some embodiments use the trench width and spacing in the insulative layer to calculate the effective surface area as follows:

$$A_{\text{eff}} = 2T_e/(L_W + L_S)D^2 + D^2, \quad (5A)$$

for a repeating line and spacing structure where $L_W$ is the trench width and LS is the space between trenches. For a more practical layout where the trenches and spacing are not repeating themselves, some embodiments use the following:

$$A_{\text{eff}} = 2T_e/(L_{W\_avg} + L_{S\_avg})D^2 + D^2, \quad (5B)$$

where $L_{W\_avg}$ and $L_{S\_avg}$ are the average trench width and spacing in a region.

Figure 5B:
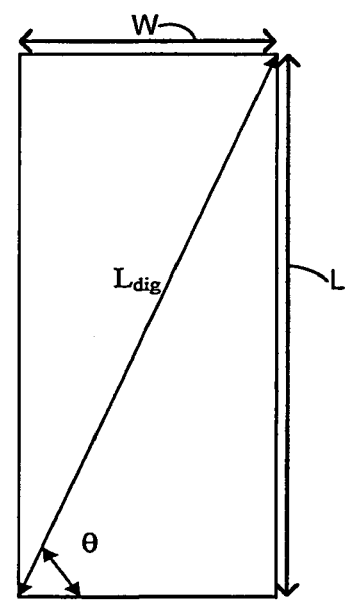
FIG. 5B illustrates computation of another layout parameter, namely the diagonal line length of a trench of dimensions L and W in accordance with some embodiments of the invention.

Furthermore, some embodiments use the diagonal length and slope of the diagonal to calculate the perimeter. For instance, as shown in FIG. 5B, the surface area corresponding to a rectangle of length L and width W can be written as $$A_{\text{eff}} = 2T_e L_{dig}(\sin\theta + \cos\theta) + D^2 \quad (5C)$$
$$= 2T_e L_{dig}[\sin(\tan^{-1}(\text{slope})) + \cos(\tan^{-1}(\text{slope}))],$$

where $L_{dig}$ is the length of the diagonal of the rectangular trench and $\theta$ is the angle of the diagonal to one of the edge of the trench and slope is the slope of the diagonal to one edge.

Furthermore, some embodiments do not calculate the surface area in-line using the above equations (5)-(5C), and instead they obtain the surface area using a look-up table as follows:

| Layout parameters (perimeter, diagonal line length, slope of diagonal line, line width, line space and so on) | Surface area |
|---|---|
| Value 1 | $S_{a\_1}$ |
| Value 2 | $S_{a\_2}$ |
| ... | ... |
| Value n | $S_{a\_n}$ |

The values of the surface area in such a look up table are pre-calculated using above equations, based on known layout parameter values. The values of surface area for other layout parameter values may be obtained by interpolation (e.g. linear interpolation or $2^{nd}$ order interpolation depending on the embodiment).

Note that some embodiments use the product of layout parameters such as perimeter and "effective trench depth" to calculate the "effective surface area". However other embodiments compute an "effective layout perimeter" and use the product of the "effective layout perimeter" times the "real trench depth" to calculate the "effective surface area". Therefore, the specific manner in which an effective surface area is computed differs, depending on the embodiment. Moreover some embodiments do not even compute the effective surface area explicitly and instead, indirectly include it in computing a vertical dimension, such as step height. Certain embodiments may not even use the effective surface area indirectly, and instead use a deposition rate (thickness growth per unit time).

From Equations (2)-(5), an equation for the deposited copper volume V is obtained as $$V = \alpha \beta A_{eff} = \alpha \beta (T_e L + D^2). \tag{6}$$

In order to evaluate the coefficients $\alpha$ and $\beta$, consider the situation where there is no object in the current region. Since L=0, $$V = \alpha \beta D^2. \tag{7}$$

In addition, when there are no objects in the current region, the Cu surface after deposition is flat. The Cu thickness is equal to the field thickness $H_0$, which can be measured directly from silicon. Therefore, $$V = H_0 D^2. \tag{8}$$

Combining Eqs. (7) and (8) yields $\alpha\beta = H_0$, and Eq. (6) can be rewritten as $$V = H_0 (T_e L + D^2). \tag{9}$$

Equation (9) formulates the Cu volume as a function of layout parameters L and D. This formula for Cu volume, which has been derived from additive physics perspective, applies to all three cases illustrated in FIGS. 6A-6C. Note that while in some embodiments, a computer is programmed to compute Cu volume as formulated in equation (9), other embodiments may use other formulations of Cu volume.

Each of the three topography types in FIGS. 6A-6C requires a different formulation of the deposited Cu volume, when determined from the topography geometry perspective. Specifically, for case (1) described paragraph [0051], from a topography geometry perspective, the volume of Cu is formulated as $$V = HD^2 - SD^2 \rho_s + TD^2 \rho, \tag{10}$$

where $\rho$ and $\rho_s$ are defined in paragraph [0051] above. Combining the two formulae (9) and (10) for the deposited Cu volume, we have $$H_0 (T_e + D^2) = HD^2 - SD^2 \rho_s + TD^2 \rho. \tag{11}$$

Figure 7B:
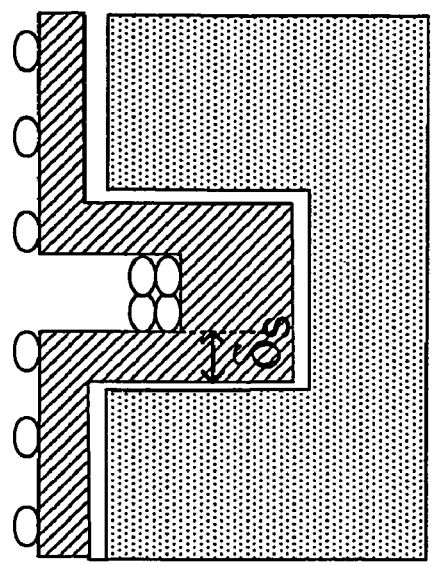
FIGS. 7A-7C illustrate evolution of a topography of a conductive trench.
Figure 7A:
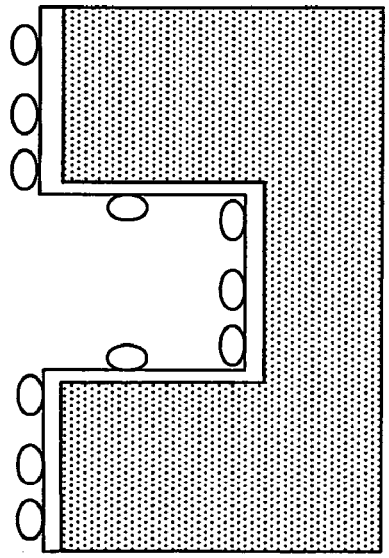
Figure 7C:
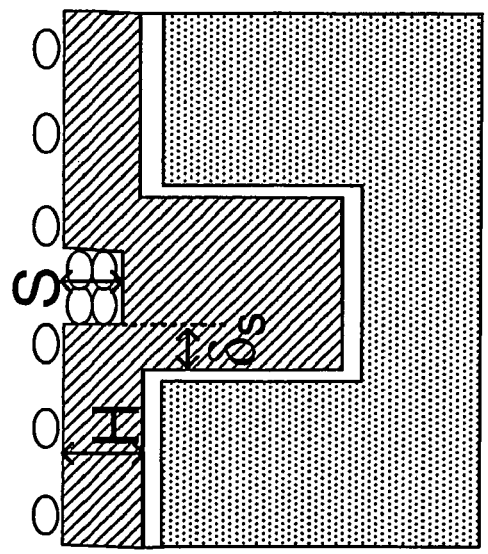

There are two unknown variables in the above equation (11), one is the step height S and the other is copper array height H. Hence, to solve for these two unknowns, another equation is needed. During copper evolution as illustrated in FIGS. 7A-7C, inventors note that the accelerators in the trench are accumulated on the trench bottom and cannot flow out of the trench, and hence the growth of copper on the oxide surface that shrinks the conductive trench by shrinkage amount $\delta_s$ is solely due to the accelerators absorbed on the oxide. Therefore, the Cu volume on the oxide is formulated as $$H_0 D^2 (1-\rho) = HD^2 (1-\rho_s). \tag{12}$$

The volume on the left side of the above equation (12) is from the additive physics perspective and that on the right side is from the geometry perspective. Therefore, array height H is obtained as $$H = H_0 (1-\rho)/(1-\rho_s). \tag{13}$$

Substitution of Eq. (13) into Eq. (11) yields the step height as $$S = H_0 (1-\rho)/[(1-\rho_s)\rho_s] + T\rho/\rho_s - H_0 T_e L/(D^2 \rho_s) - H_0/\rho_s \tag{14}$$

Note that topography density $\rho_d$ is equal to $\rho_s$ in this topography, for case 1. This equation (14) is programmed into a computer of some embodiments, to compute the step height (e.g. see act 920 in FIG. 9D).

Moreover, certain embodiments in which a computer determines effective surface area $A_{eff}$ without use of equation (5), nonetheless compute step height using a first variant of equation (14) as follows:

$$S = H_0 (1-\rho)/[(1-\rho_s)\rho_s] + T\rho/\rho_s - (H_0 A_{eff})/(D^2 \rho_s) \tag{14A}$$

Furthermore, some embodiments in which a computer determines Cu volume "V" without using equation (9), nonetheless compute step height using a second variant of equation (14) as follows:

$$S = H_0 (1-\rho)/[(1-\rho_s)\rho_s] + T\rho/\rho_s - V/(D^2 \rho_s) \tag{14B}$$

Note that equation (13) is used to compute array height H if a positive value of step height S has been computed.

In some embodiments, equation (13) is extended as follows to account for interactions between a region and its surrounding regions in units "N" of mesh size, wherein mesh size is the size of each region, w is a filtering function (e.g. a step function across an interaction length of N):

$$H_{kl} = H_0 (1 - \rho_{avg\_kl})/(1 - \rho_{savg\_kl}) \tag{13A}$$

$$H_{kl} = H_0 \{1 - \Sigma_{i=(-N/2\ to\ N/2)} \Sigma_{j=(-N/2\ to\ N/2)} \rho_{k+i,\ l+j} * W_{ij})\} / \{1 - \Sigma_{i=(-N/2\ to\ N/2)} \Sigma_{j=(-N/2\ to\ N/2)} \rho_{sk+i,\ l+j} * W_{ij})\} \tag{13B}$$

In the above equation (13), $\rho_{k+i,\ l+j}$ and sk+i, l+j are respectively nominal density $\rho$ and shrunk density $\rho_s$ respectively in a region identified by its coordinates (k+i, l+j), and $\rho_{avg\_kl}$ and $\rho_{savg\_kl}$ are the values of the nominal density $\rho$ and the shrunk density $\rho_s$, respectively that have been averaged by convolution with the filtering function for interaction length.

Therefore, current inventors have conceived of using either or both of the following two parameters: (1) interaction length and (2) weighted density function to account for the long range interactions in the ECP process. Note that in an illustrative embodiment, the weighted density function is merely any function which is non-zero within the interaction length and zero beyond the interaction length. One example for the weighted density function is a step function which is at a constant value of 1 within the interaction length. Inventors believe that the weighted density function can have any other shape within the interaction length, for example, a shape of a Gaussian function or an exponentially decaying function.

Incorporating one or more such parameters into Park's model is nowhere disclosed or suggested by Park or by any other prior art known to the current inventors.

For case (2) described in paragraph [0051], from the topography geometry perspective, the volume of the Cu is formulated as $$V = HD^2 SD^2 \rho_e + TD^2 \rho, \tag{15}$$

where $\rho$ and $\rho_e$ are the defined in paragraph [0051]. Combining the two formulae (9) and (15) for the deposited Cu volume, we obtain $$H_0 (T_e L + D^2) = HD^2 - SD^2 \rho_e + TD^2 \rho. \tag{16}$$

Figure 8B:
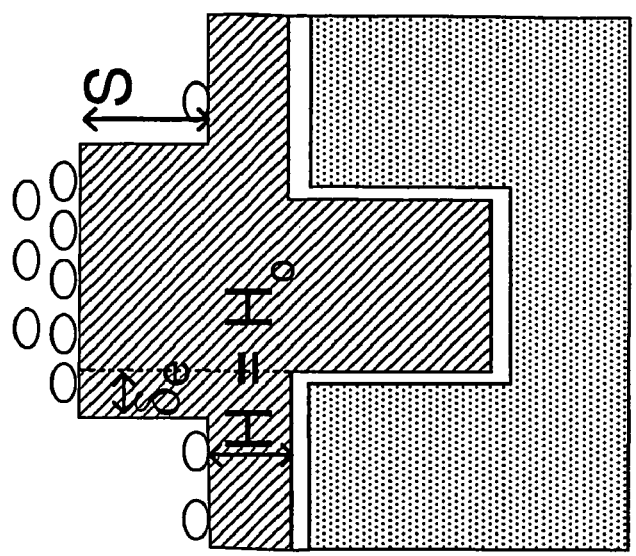
FIGS. 8A and 8B illustrate evolution of a topography of a conductive bump.
Figure 8A:
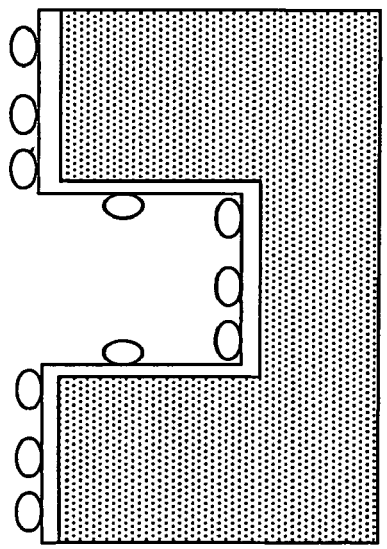

As noted above, here as well equation (16) is just one equation which contains two unknown variables: array height and step height. The other equation is obtained from topography evolution as illustrated in FIGS. 8A and 8B. In this case of super fill, only the oxide in the range of expansion amount $\delta_e$ is affected by accelerators in the trench.

For the oxide out of that range, the thickness of Cu deposited is not affected. Therefore it is the same as the Cu field thickness $H_0$. This leads to the array height H as $$H=H_0. \quad (17)$$

Substituting Equation (17) into Equation (16) yields the step height S as $$S=T\rho/\rho_e-H_0T_eL/(D^2\rho_e). \quad (18)$$

Note that the step height S in this case (2) could be either positive or negative. Positive step height S indicates that the Cu above the insulative trench forms a trench, with width larger than the width of the insulative trench.

On the other hand, negative step height S indicates that the Cu above the insulative trench forms a bump, with width larger than the width of the insulative trench. The differentiating property of this case is that the trenches or bumps of Cu are wider than the wire. The expanded amount $\delta_e$ results in another topography which appears as shown in FIG. 6B. Depending on the step height, the topography density $\rho_d$ is either $\rho_e$ or $1-\rho_e$ as shown in Eq. (1). When the step height S=0, that leads to the special case of super fill as described below for case (3).

Case (3) implies the whole region of size D is in the range of the expanded amount $\delta_e$. Therefore the entire oxide surface is affected by the accelerators in the trench and H is not equal to $H_0$ any more. Alternative equations (18A) and (18B) for embodiments which determine effective surface area $A_{eff}$ and volume V without using equations (5) and (9) are as follows:

$$S=[HD^2+TD^2-V]/(D^2\rho_e) \quad (18A)$$

$$S=[HD^2+TD^2-A_{eff}L]/(D^2\rho_e)] \quad (18B)$$

A formula for array height H assuming $\rho_e<1$ and step height S has been computed for case 2:

$$H=(T\rho/\rho_e-S)D_2\rho_e/(T_eL) \quad (19)$$

For case (3), by definition, the step height $$S=0. \quad (20)$$

Since from a topography geometry perspective, the volume of deposited Cu is formulated as $$V=HD^2+TD^2\rho. \quad (21)$$

Combining the two equations (9) and (21) for the Cu volume, we have the following equation $$H_0(T_eL+D^2)=HD^2+TD^2\rho.$$

Therefore, a formula for array height is obtained by $$H=H_0+H_0(T_eL/D^2)-T\rho. \quad (22)$$

Since the step height S=0, the topography density $\rho_d=1$.

Note in the above equation (22), the term $L/D^2$ represents the average perimeter of a region whose area is D×D. This term $L/D^2$, is similar to the layout density $\rho$, and is indicative of a 'density of perimeter' in the current region. The advantage of using this term $L/D^2$ is that region size D is not explicitly used in the equation (22). This term $L/D^2$ is also called "perimeter density" and is denoted by the symbol $L_\rho$, and is used in the following description.

Figure 9A:
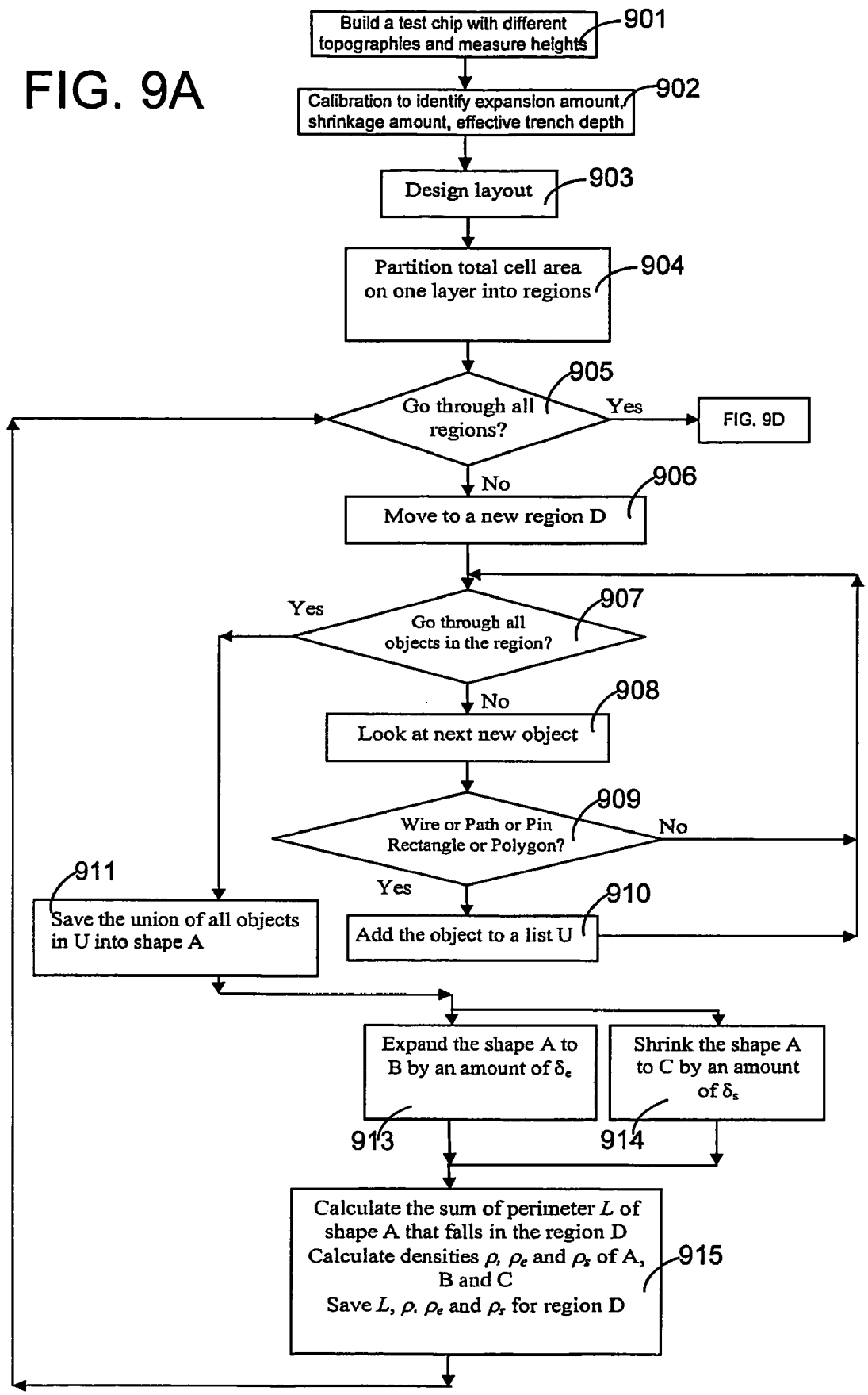
FIGS. 9A and 9D illustrate, in flow charts, acts that implement a full-chip topography simulator in some embodiments.

In some embodiments of the invention, one or more equations described above for two or more of the cases (1)-(3) are used by a method illustrated in FIG. 9A, to determine the topography (including topography type, step height and/or array height) of a production wafer. Specifically, in an act 901, a test wafer is prepared to contain a number of different topography types that are likely to occur in a production wafer, for each combination of values of perimeter and layout density that are also likely to occur in the production wafer. As an example, ten different values of perimeter and ten different values of layout density are selected in one embodiment, for a total of 100 combinations, and the test wafer is designed to contain 100 regions (one region per combination). The test wafer is then fabricated (in act 901), using the same process that is to be used to fabricate the production wafer. Next, a number of measurements are made, of a vertical dimension in each region, such as the step height and/or array height.

Thereafter, in act 902, the measurements are used to solve for the unknowns in one or more equations that are to be applied in a given embodiment. As a simple example, some embodiments (wherein mesh size is equal to interaction length), equation (13) is used to obtain an empirical value for the shrunk density $\rho_s$, after substituting into this equation the nominal values $H_0$, and $\rho$ that are extracted from a wafer's physical (geometric) design held in, for example, a GDSII file or Milkyway database (available from Synopsys, Inc.). However, in embodiments that are more typical, the mesh size (e.g. 2 microns, 5 microns or 10 microns) is smaller than the interaction length (e.g. 30 microns or 50 microns), and such embodiments use the following extended version of equation (13):

$$H_{kl}=H_0\{1-\Sigma_{i=(-N/2\ to\ N/2)}\Sigma_{j=(-N/2\ to\ N/2)}\rho_{k+i,l+j}*W_{ij})\}/$$
$$\{1-\Sigma_{i=(-N/2\ to\ N/2)}\Sigma_{j=(-N2\ to\ N/2)}\rho_{sk+i,l+j}(\rho,$$
$$\delta_s)*W_{ij})\} \quad (13C)$$

In equation (13C) all variables are known except for N and $\delta_s$ which are determined in some embodiments, by trial and error. For example, values of $N=2$, and $N=4$ (for corresponding interaction lengths of 30 microns and 50 microns when using a mesh size of 10 microns) are substituted into equation (13C). Moreover, these three equations are then repeatedly checked for a number of trial values of $\delta_s$ within a fixed range of, e.g. 15 nanometers to 500 nanometers. In some embodiments, multiple values of array height H from equation (13C), which are obtained after performing the convolutions therein, are manually checked against a measured value of H, and an appropriate pair of values for N and $\delta_s$ that generate a value for H via equation (13C) that is closest to the measured value are identified.

Figure 9B:
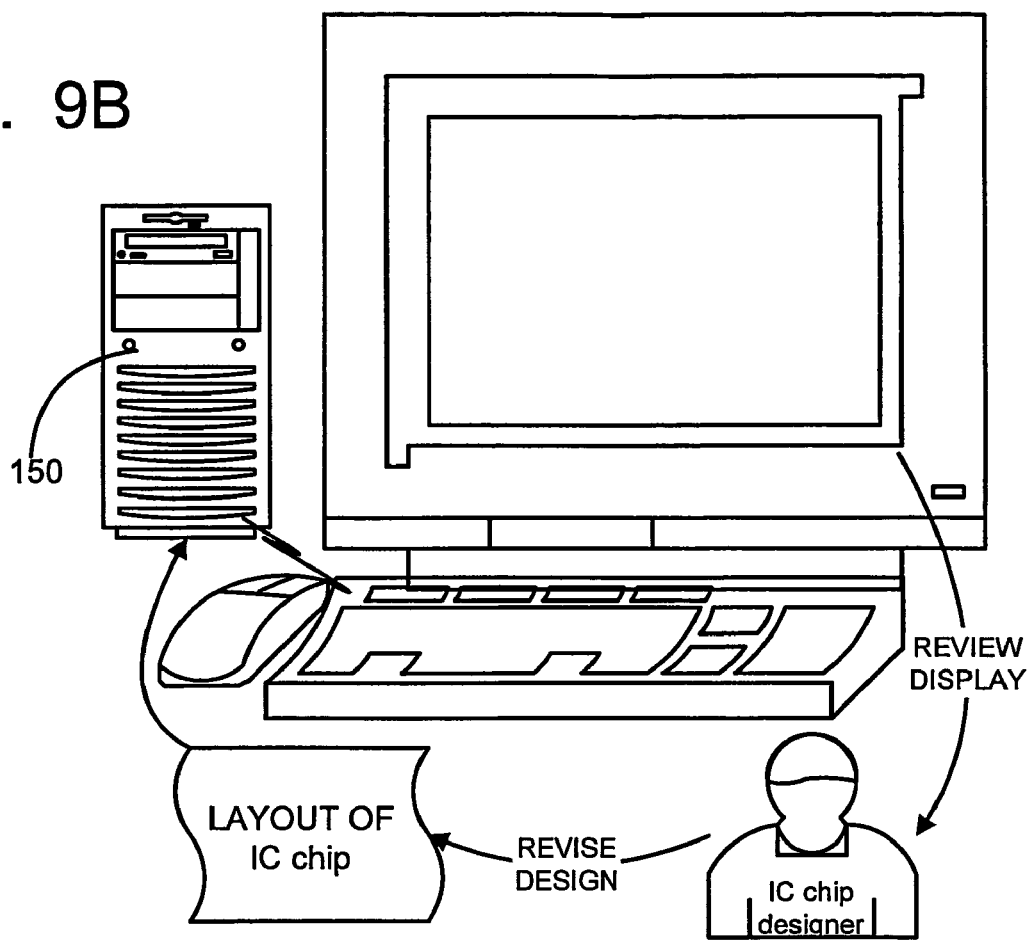
FIG. 9B illustrates a chip designer using a computer that simulates topography of a conductive material in a semiconductor wafer in one specific exemplary implementation of the invention.

In some embodiments, convolutions are performed by multiplication in the frequency domain, after generating fast fourier transforms (FFTs) of (1) the filter based on interaction length and (2) spatial matrix of nominal density in the test wafer within (N+1)×(N+1) regions surrounding the current region. Therefore, solution of equation (13C) either by trial and error or by some software (such as Mathematica or Mathcad) yields the interaction length N and shrinkage amount $\delta_s$ which are stored in a main memory of computer 150 (FIG. 9B) as the results of calibration. Moreover, some embodiments use shrinkage amount $\delta_s$ to compute the shrunk density $\rho_s$, by re-sizing the layout (of the test wafer) by this amount $\delta_s$, followed by solving for effective trench depth $T_e$ using equation (14). This value of effective trench depth $T_e$ is also stored in computer 150's main memory, as a calibration result.

Also in act 902 of some embodiments, an equation for the two case (2) topography types, e.g. equation (18) is used to compute an expansion amount $\delta_e$, as follows:

$$S_{kl} = T\rho_{\text{avg\_kl}}/\rho_{\text{eavg\_kl}} - H_0 T_e L_{\text{avg\_kl}}/(D^2 \rho_{\text{eavg\_kl}}) \quad (18C)$$

$$= T\left\{1 - \sum_{i=(-N/2 \text{ to } N/2)} \sum_{j=(-N/2 \text{ to } N/2)} \rho_{k+i,l+j} * w_{ij}\right\} /$$

$$\left\{1 - \sum_{i=(-N/2 \text{ to } N/2)} \sum_{j=(-N/2 \text{ to } N/2)} \rho_{ek+i,l+j} * w_{ij}\right\} -$$

$$H_0 T_e \left\{1 - \sum_{i=(-N/2 \text{ to } N/2)} \sum_{j=(-N/2 \text{ to } N/2)} L_{k+i,l+j} * w_{ij}\right\} /$$

$$\left(D^2 \left\{1 - \sum_{i=(-N/2 \text{ to } N/2)} \sum_{j=(-N/2 \text{ to } N/2)} \rho_{ek+i,l+j} * w_{ij}\right\}\right)$$

In the above equation, all values are known (effective trench depth $T_e$, and nominal values $H_0$, $\rho$, $T$, $D$ and $L$).

In some embodiments, the unknowns that have been obtained from the test wafer, for example two or more of (expansion amount $\delta_e$, shrinkage amount $\delta_s$, effective trench depth $T_e$, and interaction length N) are stored in memory at this stage in act 902 and thereafter treated as fixed constants, applicable in all regions of a production wafer for computing a vertical dimension of a conductive material as described below in reference to acts 913-915 (FIG. 9A). Other embodiments compute a number of different sets of such unknowns, e.g. one set in each of the 100 regions of the test wafer. The values in such sets for a given unknown (e.g. effective trench depth $T_e$) which are non-redundant are stored (for look up) in memory, in a table that is indexed by one or more layout parameters such as perimeter, diagonal line length, slope of diagonal line, line width and line space.

Figure 9C:
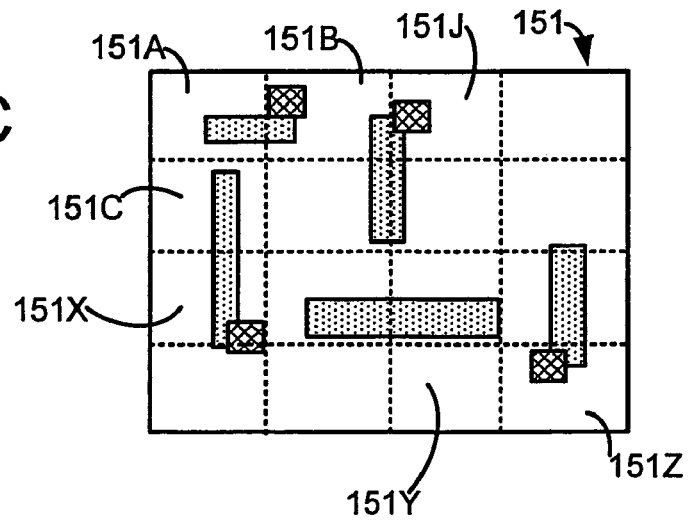
FIG. 9C illustrates a layout of a chip in the semiconductor wafer that has been subdivided by the computer of FIG. 9A into a plurality of regions whose topography is then computed in some embodiments in accordance with the acts illustrated in FIG. 9C.

In act 903 (FIG. 9A), a chip designer uses a computer 150 (FIG. 9B) to design a chip in a semiconductor wafer that is to be fabricated using the same fabrication process as the process used for manufacturing the test wafer. Note that act 903 can be performed in any order relative to acts 901 and 902. Next, to generate a topography from the design prepared in act 903, computer 150 (FIG. 9B) is programmed to accept layout 151 (FIG. 9C) of an IC chip, and then divide up layout 151 into a number of regions 151A-151Z, by applying a window of size D×D (as illustrated by act 904 in FIG. 9A). Note that a rectangular or square region 151I (FIG. 9C) is sometimes referred to as a "tile". At this stage the computer checks (in act 905) whether or not all regions in the layout have been processed, and if so goes to the convolution step (see act 916 in FIG. 9D). In some embodiments, the convolution is calculated by a direct convolution as shown in Eqs. 13(c) and 18(c) if the interaction length N is less than 10 but if N >10 the convolution is performed by fast fourier transform (FFT) and inverse fast fourier transform (inverse FFT).

Figure 9D:
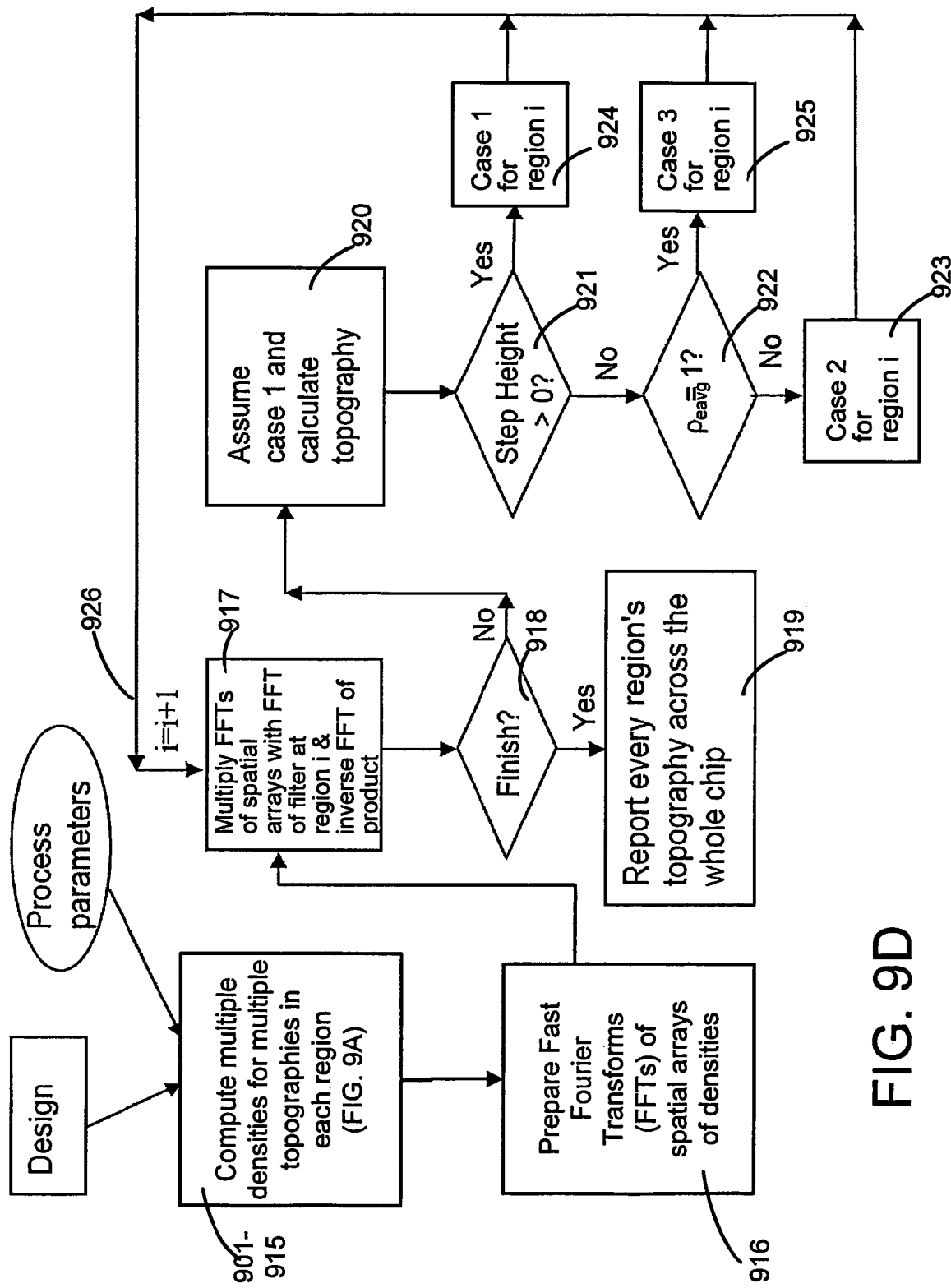

If one or more regions remain unprocessed in act 905, computer 150 performs act 906 wherein through a window (whose size is preselected to be 10 μm as discussed herein; but it could be any other value), a current region 151J (FIG. 9C) is selected for generation of densities and/or other such parameters therefrom, which are required across a number of regions when performing convolution thereof (see act 916 in FIG. 9D). Next, in act 907 (FIG. 9A) the computer checks if it has gone through all objects in a current region and if not goes to act 908. In act 908 the computer identifies the next new object, and checks in act 909 whether or not the object is one of a group consisting of (wire, path, pin, rectangle, polygon) and if not returns to act 907. If the object is found to be one in the group, then the computer goes to act 910 and adds the object to a list "U" and then returns to act 907.

In act 907, if computer 150 has finished going through all objects in the region, computer 150 goes to act 911 to save the union of all objects in list U into a shape A. Next, in acts 913 and 914 the computer 150 respectively performs the following: expands the shape A into an expanded shape B by re-scaling each coordinate of each corner of shape A by expansion amount $\delta_e$, and similarly shrinks the shape A into a shrunk shape C by re-scaling each corner by amount $\delta_s$. Values of $\delta_e$ and $\delta_s$ are obtained from calibration of height measurements from multiple regions of a test wafer as described in paragraphs [0071]-[0074].

While some embodiments use a fixed pair of values $\delta_e$ and $\delta_s$ in all regions, other embodiments of computer 150 perform one or more table lookups in act 907 to obtain an appropriate pair of values $\delta_e$ and $\delta_s$ that are applicable to the current region (e.g. depending on one or more layout parameters). In still other embodiments, the test wafer and the production wafer have the same layout, and in this situation, the values $\delta_e$ and $\delta_s$ are stored (after calibration as described in paragraph [0074]) and retrieved by computer 150 using each region's identity as the index.

Next, in act 915, computer 150 calculates a perimeter sum L of shape A. In act 915, the computer also calculates nominal density $\rho$, shrunk density $\rho_s$ and expansion density $\rho_e$, respectively based on shapes A, B and C, which involves calculating these shapes' area followed by division with the region's area $D^2$ (assuming a square region of size D; although in other embodiments, the region can be a rectangle as well). The perimeter sum L is also divided in act 915 by the region's area $D^2$ to obtain perimeter-density $L_\rho$ for the current region. Perimeter-density $L_\rho$ has been described in paragraph [0069]. Thereafter, computer 150 saves the computed values of $L_\rho$, $\rho$, $\rho_s$ and $\rho_e$ for the current region and returns to act 905 which has been described above.

In act 915, some embodiments directly calculate perimeter sum L of shape A by adding up the length of each edge in shape A, while other embodiments initially calculate the diagonal line length and slope of each object in shape A as described above in reference to FIG. 5B, and then use these values to compute the perimeter sum of shape A, while still other embodiments initially calculate the average line width $L_{W\_avg}$ and average line spacing $L_{S\_avg}$ and then use these values with the area of the region $D^2$ to compute the perimeter as:

$$2D^2/(L_{W\_avg}+L_{S\_avg})$$

On completion of act 915 for all regions of the production wafer, a main memory of computer 150 (FIG. 9B) of several embodiments holds a tuple of four layout parameters, namely: layout density $\rho$, shrunk density $\rho_s$, expanded density $\rho_e$ and perimeter-density $L_\rho$, one tuple for each region. At this stage, the main memory also holds three process parameters, namely: shrinking and expanding amounts $\delta_s$ and $\delta_e$ and effective trench depth $T_e$. Therefore, if there are any additional regions in which topography is to be determined, shrinking and expanding amounts $\delta_s$ and $\delta_e$ may be applied to the layout in such additional regions, as discussed in reference to acts 905-915 (FIG. 9A).

Referring to FIG. 9D, acts 916-917 that follow acts 901-915 (FIG. 9A) perform convolutions of spatial arrays of the four layout parameters with a spatial filter centered at each region in the layout, to take into account the effect of an interaction length N which has been determined from calibration as discussed above in paragraph [0072]. Specifically, in some embodiments, fast fourier transforms (FFTs) are prepared of each spatial array for a layout parameter in act 916. For example, four FFTs are prepared, one for each of layout density $\rho$, shrunk density $\rho_s$, expanded density $\rho_e$ and perimeter-density $L_\rho$.

An FFT of each spatial array of a layout parameter is prepared only once in act 916, and stored in a main memory of computer 150 to improve computation efficiency, followed by their repeated use in act 917 in each region i of the wafer. Act 917 is entered with a current region identified by loop counter i=0. Specifically, in act 917 the four FFTs from act 916 are multiplied with a single FFT of the current region's spatial filter, followed by preparing inverse FFTs to obtain convolution results (which are stored in computer 150's main memory as the output of act 917). Note that in other embodiments, the convolution is calculated by direct convolution (in the space domain) instead of FFTs and inverting FFTs as described above. Note that the convolution results generated in act 917 are for all formulations that could be needed in one or more of future acts 920, 923, 924 and 925.

Next, in act 920 one or more vertical dimensions, such as step height and/or array height are computed, using the convolution results and assuming one of the topography types, such as a shrunk topography type resulting from case (1) as described paragraph [0051]. For example, the following version of equation (14) is used to compute the step height S in the current region.

$$S=H_0(1-\rho_{avg})/[(1-\rho_{savg})\rho_{savg}]+(T\rho_{avg}/\rho_{savg})-H_0(T_eL_{\rho avg}-1)/\rho_{savg} \qquad (14C)$$

wherein each of the values subscripted with "$_{avg}$" are the corresponding results of convolution with the filter (e.g. $\rho_{savg}$ is the convolution result of shrunk density, $\rho_{avg}$ is the convolution result of nominal density, $L_{\rho avg}$ is the convolution result of perimeter density).

Next, in act 921, a predetermined condition that is normally applicable to case (1) topography types is checked. For example, the step height S resulting from applying equation (14C) is checked to ensure it is greater than zero. If so, then the assumption of case (1) topography type as per paragraph [0085] is confirmed as being valid, and act 924 is performed to report this case (1) type of topography as being the topography type in the current region, e.g. after computing any additional parameters, such as array height using equation (13C). Then computer 150 returns to act 917 to repeat it for another region. Note that although S>0 is checked as the predetermined condition in some embodiments, other embodiments check that one of the components of S against the other two components, e.g. check as follows (based on equation 14C).

$$H_0(1-\rho_{avg})/(1-\rho_{savg})+T\rho_{avg}>H_0(T_eL_{\rho avg}-1)$$

If such a predetermined condition is not met in act 921, computer 150 proceeds to evaluate one of the other remaining cases (2) and (3). Case (1) topography type fails to occur, e.g. if there are too many accelerators in the current region for the topography to stay in case (1). Hence, in act 922 computer 150 checks another predetermined condition in some embodiments, namely if the convolution result of expanded density, i.e. the value $\rho_{eavg}$ is equal to 1 (or within a small range surrounding 1, e.g. within 0.99 to 1.01 in alternative embodiments), and if so goes to act 925. This condition may be satisfied, e.g. when the whole region is affected by the accelerators in the trenches. Therefore, in act 925, computer 150 determines that case (3) type topography is to be reported, and assumes step height S=0 and computes array height $H=H_0+T\rho_{avg}-H_0T_eL_{\rho avg}$ (as per Eq. 22) which are then reported, and computer 150 returns to act 917. In act 922 if the condition is not met, computer 150 goes to act 923 and determines that case (2) type of topography is to be reported, and computes the related vertical dimension(s) e.g. using the convolution versions of equations (18)-(19). Thereafter, such computations, which are performed in acts 920-925 for a current region, are repeated for each of the remaining regions into which the layout has been subdivided, as illustrated by branch 926.

Note, that in some embodiments, the repeated computations for other regions are performed in the same computer sequentially, while in other embodiments they are performed in one or more additional computers in parallel with one another. Note also that on transition along branch 926 for each region, the memory holds not only the values of four layout parameters $L_\rho$, $\rho$, $\rho_s$ and $\rho_e$ for a current region, but also holds values of the topography type and/or step height and/or array height that were determined for the current region by acts 920-925. A computer readable medium (such as a memory or a carrier signal) encoded with these four layout parameters and the two vertical dimensions for each region of a semiconductor wafer, as well as the effective trench depth and the interaction length, is believed to be a novel combination in an article of manufacture that is nowhere disclosed or suggested in the prior art.

Acts 920-925 may be performed differently in different embodiments that will be apparent to the skilled artisan in view of this disclosure. For example, some embodiments determine the array height first and then determine the step height while other embodiments perform these acts in the reverse order. Moreover, some embodiments compute one or more such heights assuming any one of the three topography types (e.g. case (3) topography type may be assumed first in act 920) and on failure of the computed value to satisfy a predetermined condition applicable to the assumed topography type, re-compute such values assuming another one of the topography types. Other embodiments compute such heights for all topography types and then pick one set of computed values, for example by comparison of the values among one another. Still other embodiments check for a set of conditions that use the process parameters and the layout parameters to identify one of the topography types as the type applicable to the current region. Yet other embodiments check for validity of multiple cases (1), (2) and/or (3) simultaneously, e.g. by applying a single formula to results of multiple cases. Pseudo-code for two embodiments of the invention is attached to below, just before the claims, as Appendices A and B respectively that are incorporated by reference herein in their entirety.

Performance of acts 920-925 in some illustrative embodiments is now described. These embodiments use the fact that due to evolution of topography, accelerators in a trench do not affect the Cu growth on the oxide in the early stages. Therefore, case (1) in FIG. 6A resulting from conformal fill, is checked first in these embodiments, and step height S calculated (as per act 920 in FIG. 9D), followed by checking (in act 921) to see if the calculated value satisfies the condition that it is larger than 0. If so, then the calculated value is retained, and this value is used to compute the array height (see act 924 in FIG. 9D). Note that in this act 924, $H_0$ is input as a process parameter and $T_e$ is input as a calibration parameter. While in some embodiments, $T_e$ has a fixed common value across all regions of the wafer, in other embodiments, it is input to act 924 as an array because incoming real trench depth is available in an array (for example, to be output of a die-scale and wafer-scale etch model).

The above discussion shows that the shrunk amount $\delta_s$, the expansion amount $\delta_e$ and the effective trench depth $T_e$ are the critical process parameters that are used in some embodiments to determine which of cases (1)-(3) occurs in a region. These three parameters are the fitting parameters for a model used in some embodiments, and they are calibrated from experimental data. Some embodiments of the acts shown in FIG. 9D consider extreme cases, for example, when $\rho_s=0$ or $\rho_e=0$, it means that the topography after deposition is flat. Therefore several such embodiments directly select case (3) in act 920.

Figure 2B:
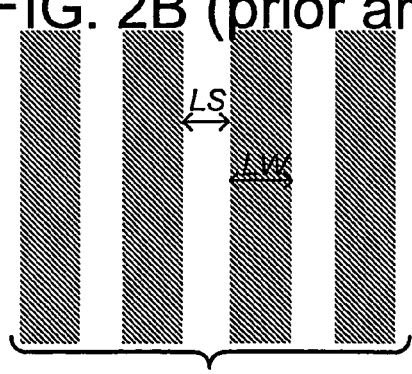
FIG. 2B shows, in a plan view, a repeating line and space structure of the type modeled by Park in his prior art method.
Figure 3:
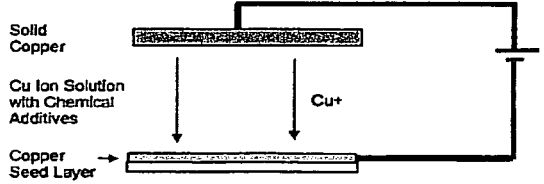
FIG. 3 shows a prior art electroplating system as per Park.
Figure 4A:
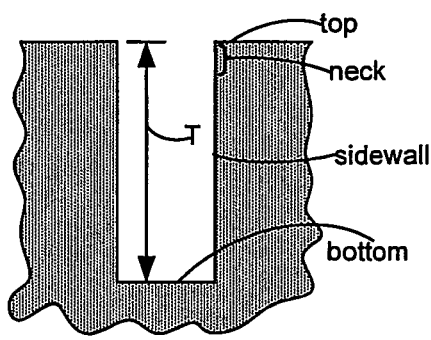
FIG. 4A shows the wafer immersed in plating bath of the prior art with additives not yet adsorbed on Cu seed, wherein accelerators are shown as "+", suppressors are shown as "−", chloride ions are shown as "c" and levelers are shown as "L".
Figure 4B:
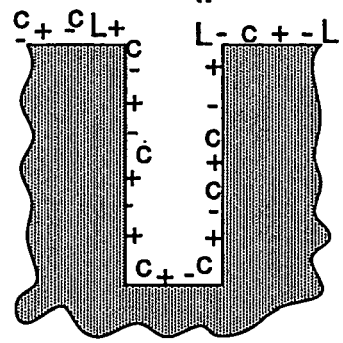
FIG. 4B shows a snapshot of the bath of FIG. 4A after 2 seconds, with the wafer immersed in plating solution prior to current flow.
Figure 4C:
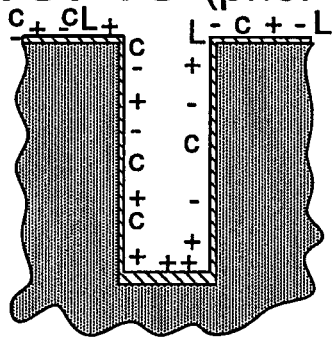
FIG. 4C shows another snapshot of the bath of FIG. 4A after 10 seconds, with conformal plating started in the trench with accelerating species accumulated near trench bottom, displacing less strongly adsorbed additives.
Figure 4D:
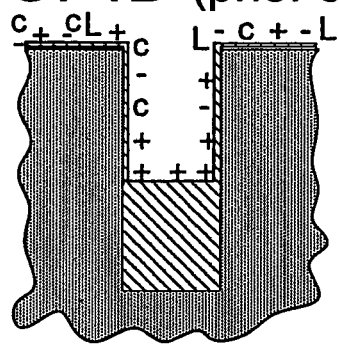
FIG. 4D shows yet another snapshot of the bath of FIG. 4A after 20 seconds, with rapid growth at trench bottom as accelerator species continue to accumulate (build up) due to decrease of surface area inside trench.
Figure 4E:
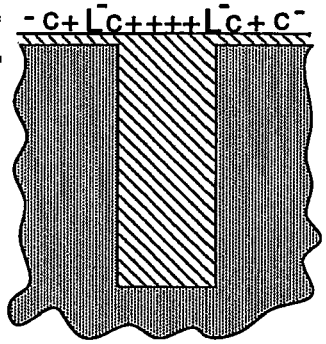
FIG. 4E shows still another snapshot of the bath of FIG. 4A after 30 seconds with fill complete and Cu over trench has an adsorbed excess of accelerating species.
Figure 4F:
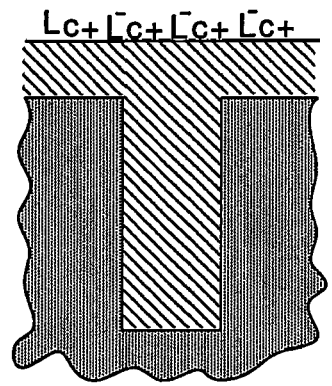
FIG. 4F shows one more snapshot of the bath of FIG. 4A after 60 seconds wherein deposition follows fill with levelers or desorption of accelerator present.
Figure 4G:
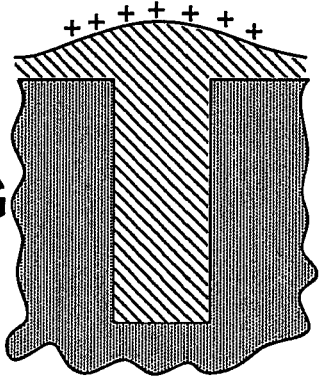
FIG. 4G shows a snapshot that is an alternative to FIG. 4F, wherein deposition follows fill following fill without levelers or desorption of accelerator.

FIG. 2 shows four topographies corresponding to four layout patterns that are analyzed below in the context of the principles described above. Note that one of the main advantages of some embodiments described herein is that they do not use purely empirical models built on regular test structures. Therefore, embodiments of the type described herein can be applied directly to any real design that may contain various patterns, i.e. not limited by any specific layout pattern.

When a wire (e.g. formed by conductive material in a trench) is wide, the convolution results of the average-perimeter density $L_{\rho avg}$ in D×D is small. Physically this means the contribution of the sidewall to the growth of the Cu in the trench is not significant and the growth of the Cu in the trench is mainly due to the additives on the trench bottom. Therefore, the Cu thickness in the trench is approximately equal to the field Cu thickness. At the surface of the oxide, the additives contribute to the growth of both the Cu on the trench oxide surfaces and that shrinks (eats) into the trench. When the spacing is large, the amount of Cu shrinking into the trench is negligible. See FIGS. 7A-7C. Hence, the additives contribute mainly to the growth of the Cu on the oxide, i.e., the Cu thickness on the oxide is approximately equal to the field Cu thickness as well. The step height S that is computed by some embodiments in this situation is approximately equal (within 10%) to the original insulative trench depth T. This implies a conformal fill. Therefore, for wide wire and wide spacing case (1) type of the topography always occurs.

When the spacing is fine, the shrunk amount of Cu into the trench is not negligible in comparison with the spacing. See FIGS. 7A-7C. Therefore, the additives on the top of the oxide contribute to the growth of both Cu on the oxide and that shrinks into the trench. This causes the trench Cu thickness on the top of oxide smaller than the field Cu thickness. Since the thickness of Cu in the wide trench is approximately equal to the field Cu thickness as in layout pattern (A), the step height S is smaller than the original trench depth. However, the Cu in the trench will never grow higher than that on the top of the oxide. Once the height of Cu in the trench is equal to that on the oxide, the additives in the trench will 'spill' out to the oxide and either case (2) or (3) will occur. Because the spacing is fine, the whole oxide surface is covered by the additives from the trenches and therefore case (3) occurs. In an extreme case where the spacing is equal to zero, case (3) occurs from the beginning of deposition. Therefore, for a wide wire and fine spacing pattern, two cases may occur. When the spacing is very fine, case (3) occurs. When the fine spacing is relatively wider, case (1) occurs.

When the trench width is fine and the spacing is large, the convolution result of perimeter-density $L_{\rho avg}$ is large. The contribution of the additives on the side wall to the growth of Cu in the trench is significant compared to that on the trench bottom. Mathematically, the step height S calculated using Eq. (14) is smaller than zero. Therefore, the additives 'spill' out at some stage during the deposition. Since the spacing is large, the additives 'spilled' out can not cover the whole oxide surface. Hence case (2) in FIG. 6B occurs for the isolated fine wire. When the wire is fine and the spacing is fine, similar to that in layout pattern (C), the additives will 'spill' out of the trench at some stage during the deposition. However, since spacing is fine, the whole oxide surface is covered by the additives 'spilled' out. Therefore case (3) occurs, as shown in FIG. 6C.

From the above discussion of the three post-ECP topography types, it is clear that the final topography type depends on layout patterns instead of simply on the layout density. For example, a layout pattern with fine wires and fine spacing and a layout pattern with wide wire and wide spacing can have the same layout density. But the former pattern leads to a conformal topography as in case (1) and the latter one leads to a super fill topography as in case (2) or (3). The current inventors note that surface area and perimeter play an important role in ECP topography. This indicates that the final topography after CMP is not solely a function of the layout density. The density based dummy filling or slotting is not sufficient for Cu CMP. Some embodiments may perform pattern-driven dummy filling or slotting algorithm considering both layout density, the object perimeters and other layout parameters which can be used to calculate the effective surface area.

Embodiments that perform chip-scale simulation may select the size of regions into which the layout is subdivided in any of a number of different ways, although some embodiments use the following method. Specifically, such embodiments determine the region size based on the interaction length of the ECP process. A region size that is smaller than the interaction length yields more accurate results in such embodiments. However, the CPU time required for whole chip simulation becomes longer, when the region size is made smaller.

Therefore, based on experimental data from Park, from Yang et al. and from Tower et al., inventors have estimated an interaction length of the ECP process in the range of several micrometers to 50 µm. Such estimates were prepared from a test wafer, from measurement data obtained using high resolution profiler (FIG. 10A); please see the explanation in paragraph [0102] below. In one embodiment, a region size of 10 µm is used. This size is smaller than the region size used in conventional CMP simulation of topographies, which is usually around 20~40 µm due to the relatively large interaction length in CMP (100~200 µm for Cu CMP, 500 µm ~2 mm for oxide CMP). The convolution of the layout density and objects perimeter (or other layout parameters which can be used to calculate the effective surface area) in each region with a pre-defined weight density function is applied in some embodiments, to incorporate the influences of neighboring regions in the range of the interaction length, in a manner similar or identical to CMP simulation of the prior art.

Therefore, interaction length is modeled in some embodiments as described in, for example the following documents each of which is incorporated by reference herein in its entirety: (1) a PhD Thesis entitled "Chip-Scale Modeling of Pattern Dependencies in Copper Chemical Mechanical Polishing Processes" by Tamba E. Gbondo-Tugbawa, Dept. of EECS, Massachusetts Institute of Technology, Cambridge, Mass., May 2002, (2) a paper entitled "Review of Chemical-Mechanical Planarization Modeling for Integrated Circuit Fabrication: From Particle Scale to Die and Wafer Scales" by Jianfeng Luo David A. Dornfeld, available on the internet at http:$$repositories.cdlib.org$lma$pmg $2002_luo_1 (wherein the URL is obtained by replacing "$" with "/"); and (3) a Phd Thesis by D. O. Ouma, "Modeling of Chemical Mechanical Polishing for Dielectric Planarization," Dept. of Electrical Engineering and Computer Science, M. I. T, Cambridge, Mass., USA, 1998.

Hence, in such embodiments, the effective (shrunk, expanded and original) densities and perimeters (or other layout parameters which can be used to calculate the effective surface area) are obtained for each region after convolution with a spatial filter based on interaction length. Also as noted above, spatial convolutions to calculate effective densities and perimeters (or other layout parameters which can be used to calculate the effective surface area) can be replaced by fast fourier transform (FFT). After that, the effective densities and perimeters (or other layout parameters which can be used to calculate the effective surface area) are used to replace the densities and perimeter through Eqs. 1 to 22 to incorporate the effects of long range interaction in ECP process.

Figure 10A:
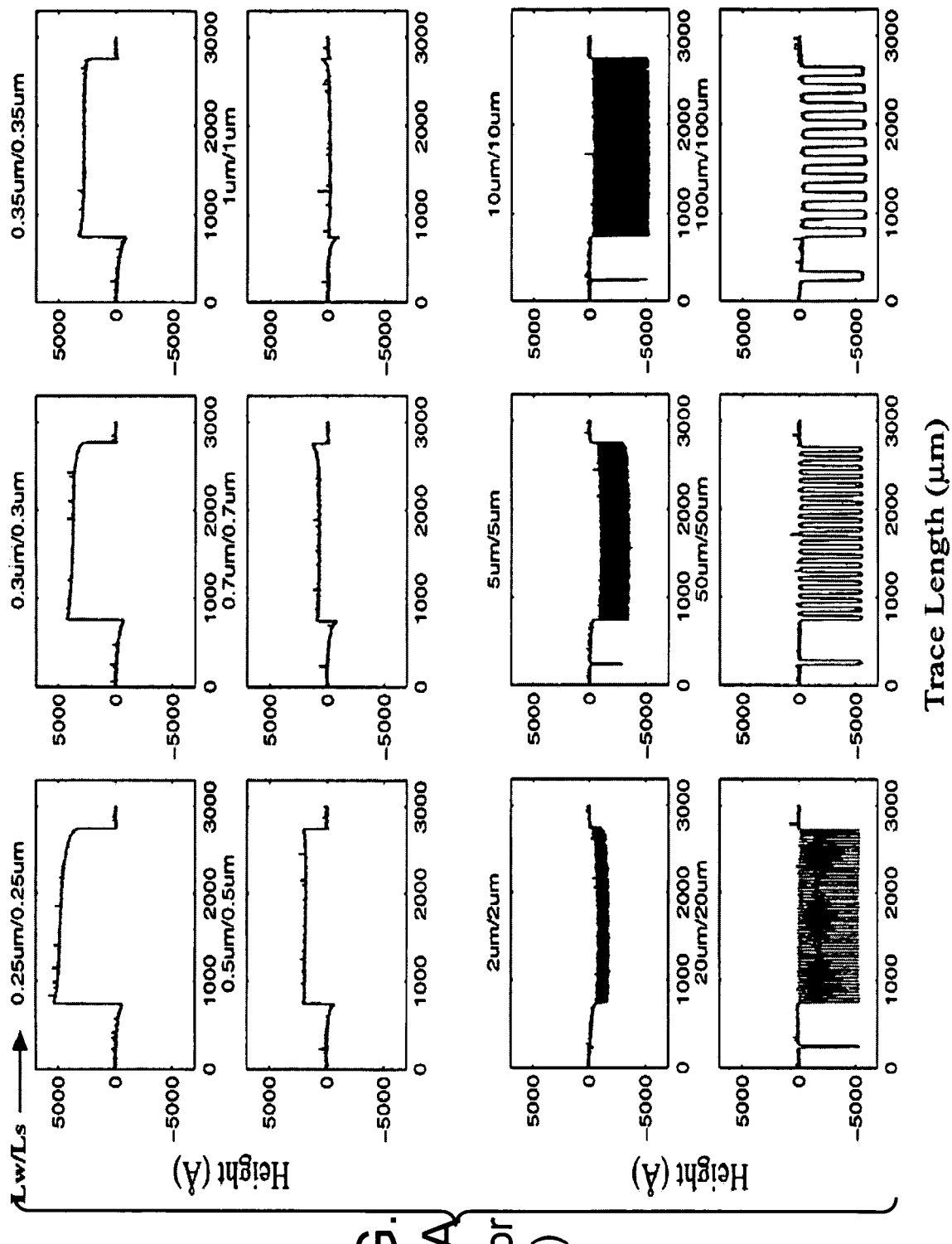
FIGS. 10A and 10B show experimentally-identified topography of the prior art by Park.
Figure 10B:
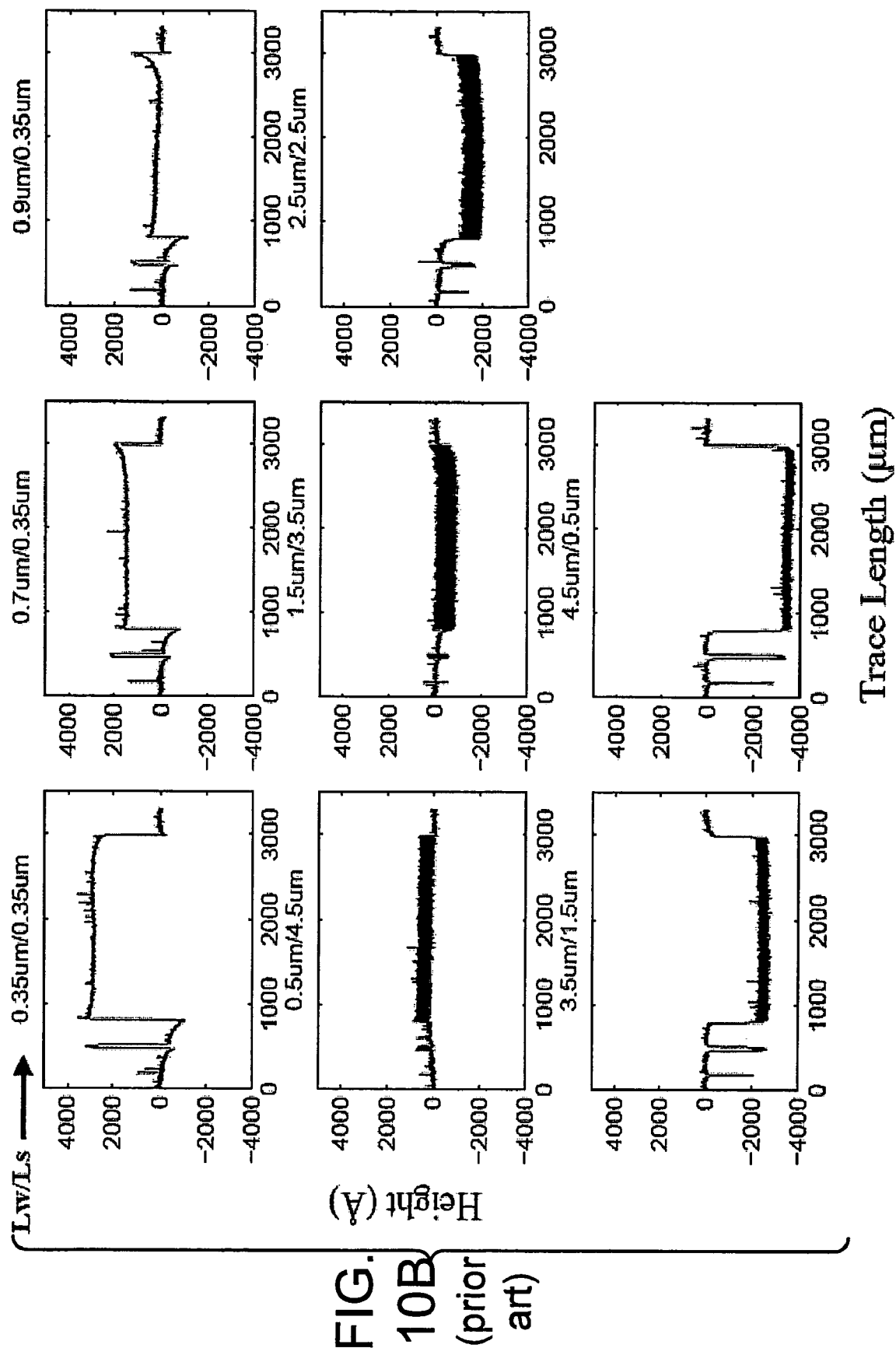
Figure 10C:
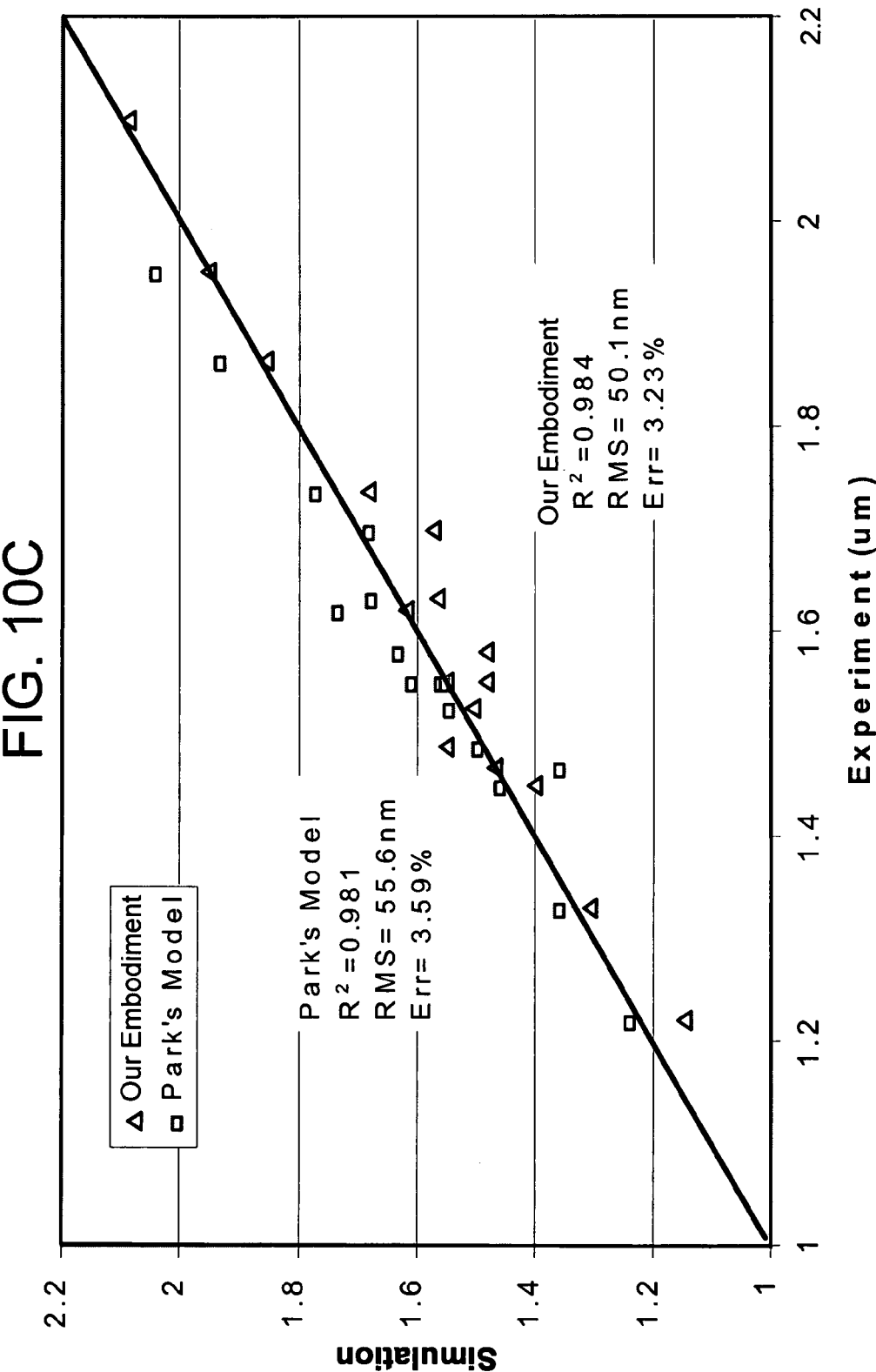
FIGS. 10C and 10D show experimental vs. simulation results, shown by triangle icons "Δ", obtained in one illustrative embodiment for array height H and step height S respectively; for comparison Park's results are shown in these figures by square icons "□".
Figure 10D:
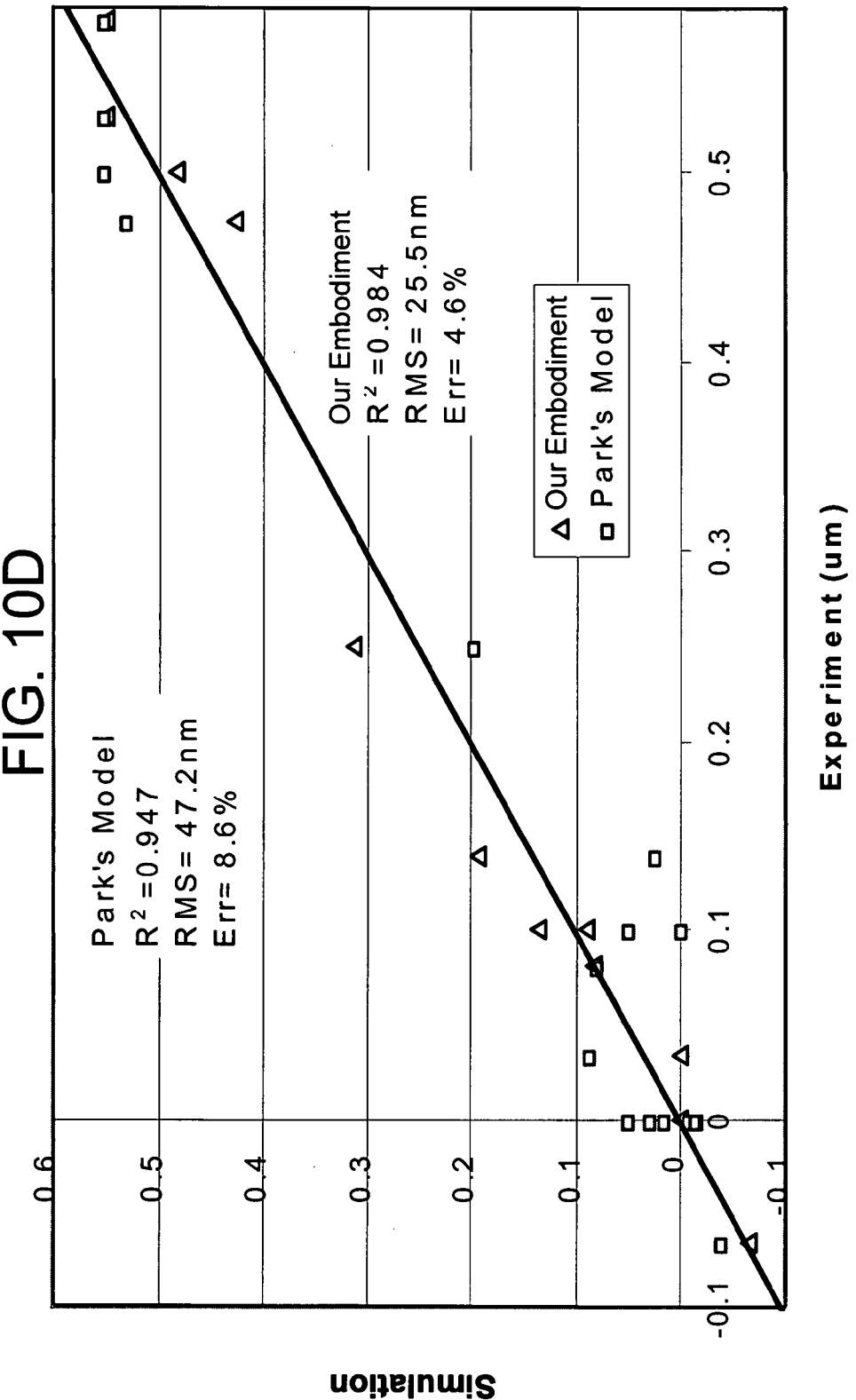

Experimental data on the test structures by Park was used in one embodiment to verify effectiveness thereof. In Park's data which is shown in FIGS. 10A and 10B, the field Cu deposition thickness $H_0$ is 1.55 μm and the trench depth T is 0.55 μm. The Cu topographies over the structures with regular wire widths and spacings spanning from 0.25 μm to 100 μm are measured using high resolution profilometer. FIGS. 10A and 10B show the topographies measured with the field Cu thickness as reference.

The GDSII file for these test structures is not provided by Park. However, once the line width $L_W$ and spacing $L_S$ are known, the layout parameters for these test structures are derived as follows:

$$\rho = L_W/(L_W + L_S),$$

$$L_\rho = 2/(L_W + L_S),$$

$$\rho_e = \begin{cases} 1 & \text{when } \delta_e \geq L_S/2, \\ (L_W + 2\delta_e)/(L_W + L_S) & \text{when } \delta_e < L_S/2, \end{cases}$$

$$\rho_s = \begin{cases} 0 & \text{when } \delta_s \geq L_W/2, \\ (L_W - 2\delta_s)/(L_W + L_S) & \text{when } \delta_s < L_W/2. \end{cases}$$

Figure 11A:
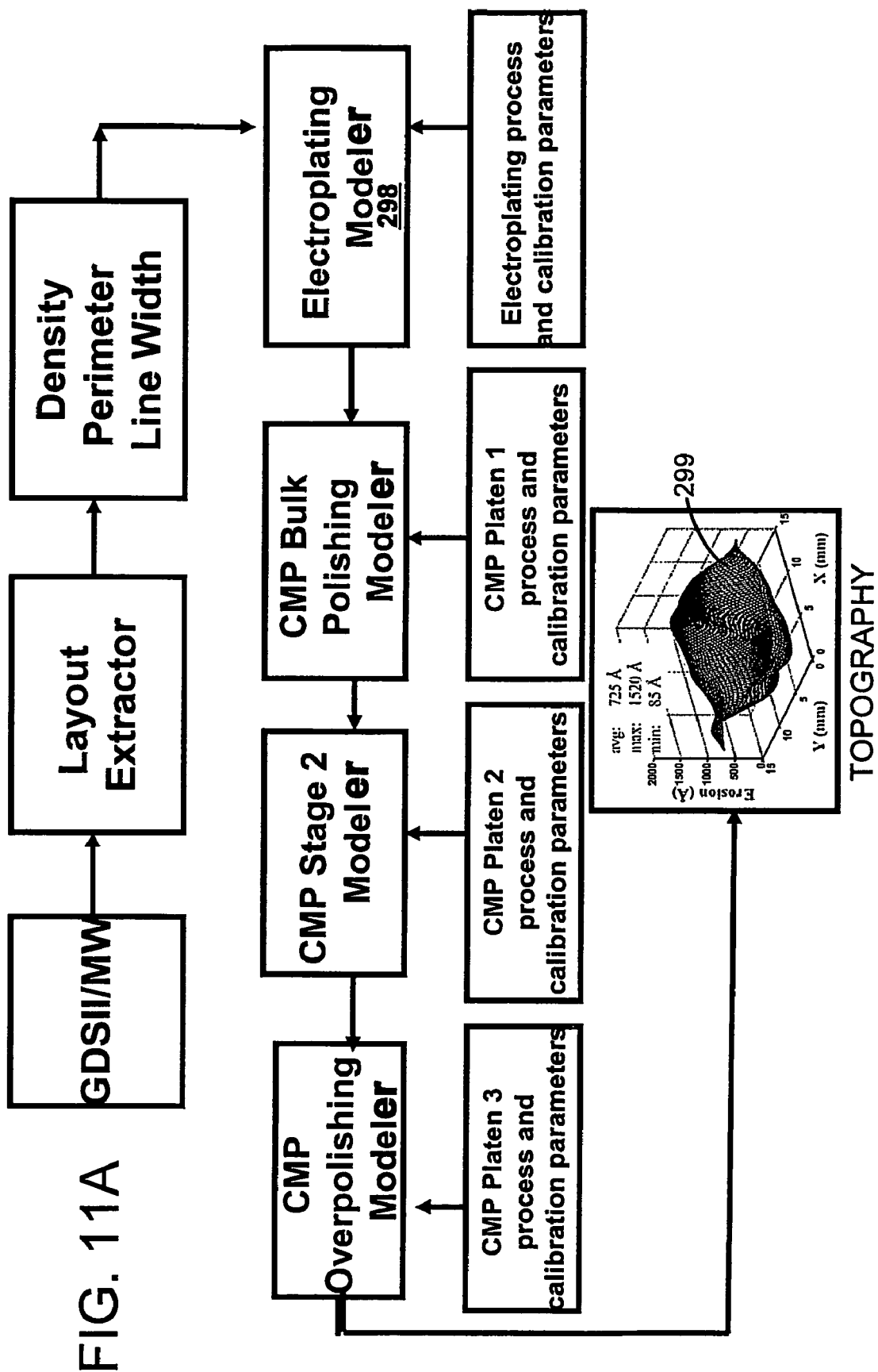
FIG. 11A illustrates, in a block diagram, optional software that may be included in a computer that has been programmed with an electroplating modeler and display software to implement a topography simulator in some embodiments of the invention.
Figure 11B:
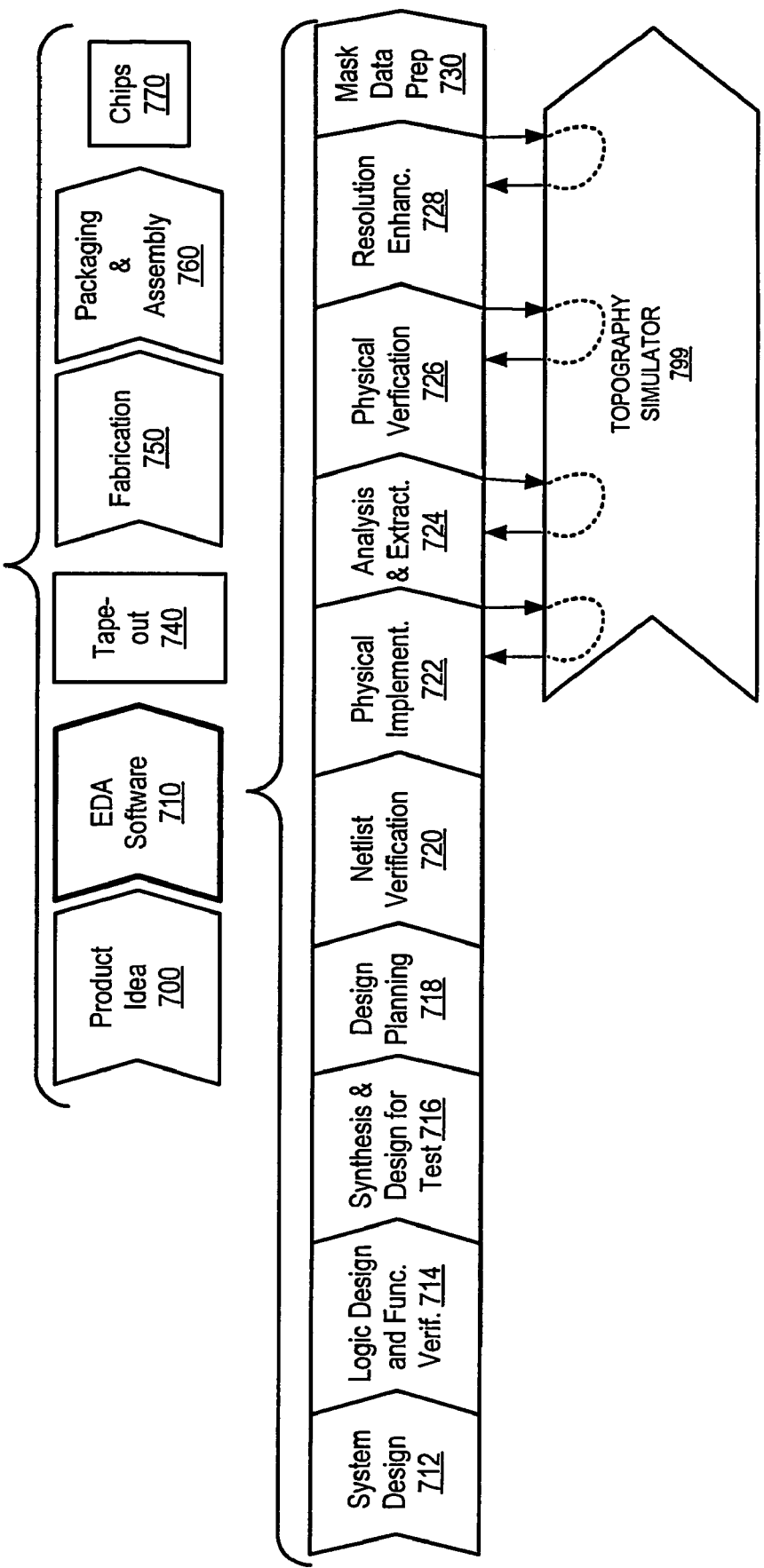
FIG. 11B illustrates, a simplified representation of an exemplary digital ASIC design flow in accordance with the invention.

Substituting these layout parameters into the above equations (14) and (18) provides formulae that are used in some embodiments to simulate the array height H and step height S. In FIGS. 11A and 11B, the triangles show the correlation between experimental data and the simulation data from one embodiment. The correlation clearly shows that the simulation results fit the experimental data well. The average errors are 3.23% for the array height and 4.6% for the step height. Simulation data obtained by Park is also plotted in FIGS. 11A and 11B, for comparison. Correlation of Park's simulation data with the experimental data is illustrated by squares. FIGS. 11A and 11B show that an embodiment of the type described herein fits the experimental data better than Park, especially for step height as shown in FIG. 11B.

The values of the three calibration parameters used in FIGS. 11A and 11B are: $\delta_e$=750 nm, $\delta_s$=133 nm, and $T_e$=130 nm. These values are quite reasonable considering their physical meanings. Compared with the actual feature trench depth T of 550 nm, $T_e$=130 nm implies that the concentration of the accelerators on the side wall is 130/550=0.23=23% of that on the top and bottom of the trench. $\delta_e$=750 nm indicates that the accelerators in the trench spread 750 nm from each side of the trench after they 'spill' out of the trench. $\delta_s$=133 nm implies that the initial thickness increase on the side wall before accelerators moving from the wall to the trench bottom is 133 nm. This small value makes sense considering the short time that the accelerators are absorbed on the walls. The interaction length cannot be directly obtained from this set of experimental data simply because the fact that in above test structures, the values of wire width and spacing are identical in a long range, which is much larger than the actual interaction length. However, the interaction length range can be estimated from the experimental results to be between 20 μm and 50 μm.

It is observed that for the 20 μm/20 μm wire width/spacing structure the Cu thickness on the oxide is smaller than the field Cu thickness. See FIG. 10. Hence, the interaction length should be larger than 20 μm in this example. For a similar reason, the interaction length should be smaller than 50 μm since the Cu thickness on the oxide of the 50 μm/50 μm test structures is equal to the field Cu thickness already (FIGS. 10A and 10B). Therefore, for 50 μm/50 μm and 100 μm/100 μm structures, the wire width and spacing should be considered to be independent of each other. This indicates that in the simulation $\rho_e$=1, $\rho_s$=1, $\rho$=1, $L_\rho$=0 should be applied to the tiles that are totally covered by the wide wires, and $\rho_e$=0, $\rho_s$=0, $\rho$=0, $L_\rho$=0 should be applied to the tiles that are totally covered by the spacing. This yields a 1.55 μm Cu thickness on the oxide spacing and a 1.55 μm Cu thickness in the trench. The step height is 0.55 μm, which is the same as the trench depth, implying a conformal fill.

Simulations on a real chip with six metal layers were performed in one embodiment, using calibration parameters obtained from the last paragraph. Simulation results on metal three as one representative example are now discussed. To avoid confusion caused by a negative step height in case (2), we now introduce the parameters actual array height and actual step height into the simulation. When the step height is positive, they are equal to the array height and step height respectively. The only difference is in case (2) where the step height is negative. In this situation, the actual array height is equal to H–S and the actual step height is equal to –S. The actual step height is always positive and the actual array height is always the highest height in the region.

There are two purposes for these simulations, one is to test the applicability of one embodiment to a real chip, the other is to test the sensitivity of this embodiment to interaction length. Reasonable simulation results were obtained as discussed next. The actual array height obtained by our embodiment ranges from 1.0 to 2.4 μm, with 1.0 μm corresponding to the skirt of the chip and 2.4 μm corresponding to the center of the chip. This makes sense because the skirt is patterned with fine spacing and wide wires, whereas the center of the chip is patterned with fine spacing and fine wires. The step height obtained by our embodiment ranges from 0 to 0.9 μm, with 0 μm corresponding to empty areas on the four corners of the chip and 0.9 μm corresponding to the center of the chip. This is reasonable because on the empty area, a flat Cu surface with field Cu thickness $H_0$ is expected. For the layout patterns with fine spacing and wires in the center of the chip, the actual step height increases with the array height, hence a larger step height is obtained.

The simulation results also show the sensitivities of the topography to the change of interaction length. When the interaction length is increased from 10 μm to 50 μm, the actual array height variation decreases from 1.4 µm to 1.2 µm; the step height variation decreases from 0.9 µm to 0.7 µm. Therefore, an accurate calibration of the interaction length is used for accurate simulations in some embodiments.

A full-chip ECP topography model is implemented in several embodiments of the invention. Key advantages of such embodiments over a purely empirical model of the type disclosed by Park are: i) embodiments built based on additive physics in the ECP deposition process require much fewer process parameters to calibrate, ii) embodiments using a unified model for the evaluation of array height and step height preserve interactions between these two variables, iii) most embodiments can be applied to arbitrary layout patterns in practical designs and are not limited to just regular test structures, iv) incorporation of interaction length into most embodiments is easy and enables efficient full chip ECP simulation.

Embodiments of the type described herein can be used for full-chip ECP and CMP topography simulation to help evaluate a layout for catastrophic failure prevention, yield-aware design and variation aware timing analysis. Such embodiments can also be used for the pattern-driven model-based dummy fillings and slotting. In many embodiments, the array height and step height are input into a CMP simulator such as that described in the above-identified PhD Thesis by Tamba E. Gbondo-Tugbawa to predict the post Cu wire and oxide variation as a function of layout design.

If the thickness variation is found to be out of the focus plane of the lithography process following CMP, a catastrophic failure is deemed to have occurred. Hence, such embodiments use a simulator to pre-screen layout design to prevent such kind of failure. In some embodiments, the Cu wire and oxide thickness variation are input into an RC extractor to evaluate the parasitics as a function of layouts, which are input into a timing analysis tool to evaluate the effect of post-ECP and post-CMP thickness variation on the timing. The dummy filling and slotting is used to make the layout uniform for a uniform topography. An ECP model is used to optimize the dummy insertion and slotting. The timing analysis and yield prediction are done without change to the user, in some embodiments.

Note that a computer 150 that implements method 200 (FIG. 9A), is referred to as "Electroplating Modeler" 298. Computer 150 may be further programmed with one or more additional software programs that are commercially available in the market. Specifically, computer 150 is also programmed in some embodiments with display software for showing on a video monitor a topography 299 that results from simulation to a chip designer (as illustrated in FIG. 9A). Computer 150 when programmed with at least electroplating modeler 298 and display software is hereinafter referred to as a "topography simulator".

Depending on the embodiment, the topography simulator may be further programmed, as shown in FIG. 11A, with a layout extractor that reads a GDSII file or Milkyway database and generates layout specific parameters, such as perimeter, line and density which are supplied as input to electroplating modeler 298. Also depending on the embodiment, a topography simulator may be programmed with a CMP bulk polishing modeler that receives a topography generated by Electroplating Modeler 298 as its input. The topography simulator may also be programmed with a CMP Stage 2 modeler and a CMP Overpolishing modeler or any other software related to chip design, as will be apparent to the skilled artisan.

Any topography simulator of the type described above may be used in a digital ASIC design flow, which is illustrated in FIG. 11B in a simplified exemplary representation. At a high level, the process of designing a chip starts with the product idea (700) and is realized in an EDA software design process (710). When the design is finalized, it can be taped-out (event 740). After tape out, the fabrication process (750) and packaging and assembly processes (760) occur resulting, ultimately, in finished chips (result 770).

The EDA software design process (710) is actually composed of a number of stages 712-730, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC. A brief description of the components of the EDA software design process (stage 710) will now be provided.

System design (stage 712): The circuit designers describe the functionality that they want to implement, they can perform what-if planning to refine functionality, check costs, etc. Hardware-software architecture partitioning can occur at this stage. Exemplary EDA software products from Synopsys, Inc. that can be used at this stage include Model Architect, Saber, System Studio, and DesignWare® products.

Logic design and functional verification (stage 714): At this stage, the VHDL or Verilog code for modules in the system is written and the design (which may be of mixed clock domains) is checked for functional accuracy. More specifically, does the design as checked to ensure that produces the correct outputs. Exemplary EDA software products from Synopsys, Inc. that can be used at this stage include VCS, VERA, DesignWare®, Magellan, Formality, ESP and LEDA products.

Synthesis and design for test (stage 716): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this stage include Design Compiler®, Physical Compiler, Test Compiler, Power Compiler, FPGA Compiler, Tetramax, and DesignWare® products.

Design planning (stage 718): Here, an overall floorplan for the chip is constructed and analyzed for timing and top-level routing. Exemplary EDA software products from Synopsys, Inc. that can be used at this stage include Jupiter and Flooplan Compiler products.

Netlist verification (stage 720): At this step, the netlist is checked for compliance with timing constraints and for correspondence with the VHDL/Verilog source code. Exemplary EDA software products from Synopsys, Inc. that can be used at this stage include VCS, VERA, Formality and PrimeTime products.

Physical implementation (stage 722): The placement (positioning of circuit elements) and routing (connection of the same) occurs at this step. Exemplary EDA software products from Synopsys, Inc. that can be used at this stage include the Astro product. Note that the output of this stage 722 may be used in topography simulator 799 as shown in FIG. 11B. Various embodiments of topography simulator 799 have been described above in reference to FIGS. 9A-9D and FIG. 11A. If the displayed results are not satisfactory, a chip designer may go back to stage 722 to make changes to the layout. Although circuitry and portions thereof (such as rectangles) may be thought of at this stage as if they exist in the real world, it is to be understood that at this stage only a layout exists in a computer 150. The actual circuitry in the real world is created after this stage as discussed below.

Analysis and extraction (stage 724): At this step, the circuit function is verified at a transistor level, this in turn permits what-if refinement. Exemplary EDA software products from Synopsys, Inc. that can be used at this include Star RC/XT, Raphael, and Aurora products. Note that topography simulator 799 may also be used with the output of this stage 724.

Physical verification (stage 726): At this stage various checking functions are performed to ensure correctness for: manufacturing, electrical issues, lithographic issues, and circuitry. Exemplary EDA software products from Synopsys, Inc. that can be used at this include the Hercules product. Note that topography simulator 799 may also be used with the output of this stage 726.

Resolution enhancement (stage 728): This involves geometric manipulations of the layout to improve manufacturability of the design. Exemplary EDA software products from Synopsys, Inc. that can be used at this include iN-Phase, Proteus, and AFGen products. Note that topography simulator 799 may also be used with the output of this stage 728.

Mask data preparation (stage 730): This provides the "tape-out" data for production of masks for lithographic use to produce finished chips. Exemplary EDA software products from Synopsys, Inc. that can be used at this include the CATS(R) family of products. Note that topography simulator 799 may also be used with the output of this stage 730. Actual circuitry in the real world is created after this stage, in a wafer fabrication facility (also called "fab").

The data structures and software code for implementing one or more acts described in this detailed description can be encoded into a computer-readable medium, which may be any storage medium and/or any transmission medium that can hold code and/or data for use by a computer. Storage medium includes, but is not limited to, magnetic and optical storage devices such as disk drives, magnetic tape, CDs (compact discs), and DVDs (digital versatile discs). Transmission medium (with or without a carrier wave upon which the signals are modulated) includes but is not limited to a wired or wireless communications network, such as the Internet. In one embodiment, the transmission medium uses a carrier wave that includes computer instruction signals for carrying out one or more steps performed by the methods illustrated in FIGS. 9C and 9D.

Note that a computer system used in some embodiments to implement a topography simulator of the type described herein uses one or more linux operating system workstations (based on IBM-compatible PCs) each containing a 2 GHz CPU and 1 GB memory, that are interconnected via a local area network (Ethernet). The memory of a topography simulator as described herein is believed to be nowhere disclosed or suggested by any prior art known to the inventors.

Numerous modifications and adaptations of the embodiments described herein will become apparent to the skilled artisan in view of this disclosure. Hence, although some embodiments have been described herein for the Astro tool available from Synopsys, Inc, other embodiments use other tools, such as Hera tool available from IBM Corporation and Moat tool available from Texas Instruments. Although selection of one of multiple topographies (via three cases) is illustrated for two embodiments in appendices A and B, other embodiments perform case selection using different logical tests (by using different Boolean operation/combinations) that will be apparent to the skilled artisan. Numerous modifications and adaptations of the embodiments described herein are encompassed by the scope of the invention.

| APPENDIX A |
|---|
| First Calculate expansion density $\rho_{eavg}$<br>    If($\rho_{eavg}$ == 1)<br>        If(step height based on case 1 equations > 0)<br>        Then<br>            Decide Case 1 topography type;<br>            Compute & Report topography;<br>        Else<br>            Decide Case 3 topography type;<br>            Compute & Report topography;<br>        End<br>    Else<br>        If(step height based on case 1 equations > 0)<br>        Then<br>            Decide Case 1 topography type;<br>            Compute & Report topography;<br>        Else<br>            Decide Case 2 topography type;<br>            Compute & Report topography;<br>        End<br>    End |

| APPENDIX B |
|---|
| First calculate step height S based on case 1 equations<br>If (step height S > 0)<br>Then<br>    Decide Case 1 topography type;<br>    Compute & Report topography;<br>Else<br>    If(expansion density $\rho_{eavg}$ == 1)<br>    Then<br>        Decide Case 3 topography type;<br>        Compute & Report topography;<br>    Else<br>        Decide Case 2 topography type;<br>        Compute & Report topography;<br>    End<br>End |

What is claimed is:

1. A computer-implemented method of simulating topography of a conductive material in a production wafer, the method comprising:

computing a height of the conductive material in a current region in a plurality of regions in the production wafer, using at least one experimental measurement from a test wafer prepared by a process that is to be used to prepare the production wafer;

wherein said computing is based on a first amount of difference in widths between a feature of an object to be formed in the conductive material and a corresponding feature in an insulative layer over which the conductive material is to be located;

checking if a result in said computing satisfies a predetermined condition, and if satisfied reporting the height in a topography; and if the result does not satisfy the predetermined condition, recomputing said height based on a second amount of difference.

2. The method of claim 1 wherein:
the corresponding feature comprises a trench;
the experimental measurement is used to compute an effective depth Te of the trench in the insulative layer;
at least one dimension from a layout of the insulative layer in the current region in a design of the production wafer is used to compute a nominal perimeter L of sidewalls of the trench in the insulative layer; and
said computing uses the product Te*L.

3. The method of claim 1 wherein:
the corresponding feature comprises a trench;
the experimental measurement is used to compute an effective perimeter Le of the sidewalls of the trench in the insulative layer; and
said computing uses the product T*Le, wherein T is a nominal depth of the trench in the insulative layer specified in a design of the production wafer.

4. The method of claim 1 wherein:
the corresponding feature comprises a trench;
the experimental measurement is used to compute an effective perimeter Le of the sidewalls of the trench in the insulative layer; and
said computing uses the product Te*Le, wherein Te is an effective depth of any trench in the test wafer.

5. The method of claim 1 wherein:
the corresponding feature comprises a trench;
the experimental measurement is used to compute an effective surface area Aeff of sidewalls of the trench in the insulative layer in the current region; and
said computing uses the effective surface area Aeff.

6. The method of claim 1 wherein:
said computing comprises using a layout density $\rho$ in at least the current region; and
the layout density $\rho$ is defined as area of all objects in a layout in the design that are located in the current region divided by the total area of the current region.

7. The method of claim 1 further comprising using the height in at least one of:
yield-aware design;
catastrophic failure evaluation; and
variation-aware timing analysis.

8. The method of claim 6 wherein:
said computing additionally uses the topography density of a plurality of regions surrounding the current region within a predetermined interaction length.

9. A computer-implemented method of simulating topography of a conductive material in a production wafer, the method comprising:
computing a height of the conductive material in a current region in a plurality of regions in the production wafer, using at least one experimental measurement from a test wafer prepared by a process that is to be used to prepare the production wafer;
checking if a result in said computing satisfies a predetermined condition, and if satisfied reporting the height; and
if the result does not satisfy the predetermined condition, recomputing said height;
wherein the height obtained from said computing is array height H defined to be thickness of the conductive material above an underlying non-conductive layer.

10. The method of claim 9 wherein:
the experimental measurement is obtained from calibration of said test wafer taking into account different concentrations of accelerators at different locations.

11. A computer-implemented method of simulating topography of a conductive material in a production wafer, the method comprising:
computing a height of the conductive material in a current region in a plurality of regions in the production wafer, using at least one experimental measurement from a test wafer prepared by a process that is to be used to prepare the production wafer;
checking if a result in said computing satisfies a predetermined condition, and if satisfied reporting the height; and
if the result does not satisfy the predetermined condition, recomputing said height;
wherein the height obtained from said computing is step height S defined to be difference between:
height of the conductive material above a top surface of a neck region adjoining a trench in a non-conductive layer; and
height of the conductive material above a bottom surface of said trench.

12. The method of claim 11 wherein:
the experimental measurement is obtained from calibration of said test wafer taking into account different concentrations of accelerators at different locations.

13. A computer-implemented method of simulating topography of a conductive material in a production wafer, the method comprising:
computing a height of the conductive material in a current region in a plurality of regions in the production wafer, using at least one experimental measurement from a test wafer prepared by a process that is to be used to prepare the production wafer;
wherein said computing is based on a first amount of difference in widths between a feature of an object to be formed in the conductive material and a corresponding feature in an insulative layer over which the conductive material is to be located;
checking if a result in said computing satisfies a predetermined condition, and if satisfied reporting the height in a topography; and
if the result does not satisfy the predetermined condition, recomputing said height based on a second amount of difference;
wherein said computing comprises using a topography density $\rho_d$ in at least the current region that is obtained by dividing an area of all objects of the layout in the current region by total area of the current region, after said all objects are re-sized by said first amount.

14. The method of claim 13 wherein:
said computing additionally uses the topography density of a plurality of regions surrounding the current region within a predetermined interaction length.

15. The method of claim 13 wherein:
the first amount is a shrinkage amount $\delta_s$;
the topography density $\rho_d$ is shrunk density $\rho_s$, which is computed after shrinking widths of all objects in the insulative layer in the current region by amount $\delta_s$; and
the second amount is an expansion amount $\delta_e$.

16. The method of claim 13 wherein:
the first amount is an expansion amount $\delta_e$;
the topography density $\rho_d$ is expanded density $\rho_e$, which is computed after expanding widths of all objects in the insulative layer in the current region by amount $\delta_e$; and
the second amount is a shrinkage amount $\delta_s$.

17. The method of claim 1 further comprising:
using a thickness $H_0$ of the conductive material in a field region in the semiconductor wafer.

18. A computer-readable medium encoded with computer instructions to perform the method of claim 1.

19. A computer-implemented method of simulating topography of a conductive material in a semiconductor wafer, the method comprising:
   computing a nominal density of a layout in a current region of the semiconductor wafer;
   computing a changed density of a re-sized layout;
   wherein the re-sized layout is obtained by changing dimensions of all objects in the layout in the current region in a predetermined manner according to which a feature in the conductive material is expected to differ from a corresponding feature in an underlying insulative layer assuming a predetermined topography based on the features;
   wherein each dimension is changed based on at least one experimental measurement obtained from calibration of a test wafer taking into account different concentrations of accelerators at different locations;
   computing a height of said conductive material, using the nominal density and the changed density; and
   checking if the height resulting from said computing satisfies a predetermined condition, and if satisfied reporting a topography comprising the height.

20. A computer-readable medium encoded with computer instructions to perform the method of claim 19.

21. The method of claim 19 wherein:
   each feature is a trench;
   said predetermined structure comprises the trench in the conductive material shrunk by a shrinkage amount $\delta_s$ relative to the corresponding trench in the insulative layer; and
   changing of dimensions in the predetermined manner uses the amount $\delta_s$.

22. The method of claim 21 wherein:
   if the height does not satisfy the predetermined condition, said method further comprises re-computing said height, using an expansion amount $\delta_e$ to change dimensions in the predetermined manner.

23. A computer-readable medium resulting from simulating topography in a layout of conductive material in a semiconductor wafer subdivided into a plurality of regions, computer-readable medium being encoded with:
   a perimeter sum obtained by adding up a plurality of dimensions of a number of objects in the layout located at least partially within a current region in said plurality of regions, wherein the perimeter sum is associated with said current region and includes a portion of each dimension in said plurality of dimensions if said portion is located within said current region; and
   an additional dimension of the conductive material that is perpendicular to each dimension in said plurality of dimensions used to obtain the perimeter sum, wherein the additional dimension is also associated with said current region.

24. The computer-readable medium of claim 23 further comprising:
   shrunk density $\rho_s$ of said layout, which is computed after shrinking widths of all objects within said current region and in a non-conductive layer located underneath the conductive material, by a shrinkage amount $\delta_s$ by which a first width in the conductive material is expected to be smaller than a second width in the non-conductive layer, wherein the shrunk density $\rho_s$ is also associated with said current region.

25. The computer-readable medium of claim 23 further comprising:
   expanded density $\rho_e$ of said layout which is computed after expanding widths of all objects within said current region and in a non-conductive layer underneath the conductive material, by an expansion amount $\delta_e$ by which a first width in the conductive material is expected to be larger than a second width in the non-conductive layer, wherein the expanded density $\rho_e$ is also associated with said current region.

26. The computer-readable medium of claim 23 wherein:
   said additional dimension is step height S defined to be difference between height of the conductive material above a non-conductive layer in the semiconductor wafer and height of the conductive material above a trench in the non-conductive layer.

27. The computer-readable medium of claim 23 wherein:
   said additional dimension is array height H defined to be thickness of the conductive material above a non-conductive layer in the semiconductor wafer.

28. The computer-readable medium of claim 23 wherein:
   said additional dimension is array height H defined to be thickness of the conductive material above a non-conductive layer in the semiconductor wafer;
   the computer-readable medium is further encoded with step height S defined to be difference between height of the conductive material above the non-conductive layer and height of the conductive material above a trench in the non-conductive layer; and
   the step height S is also associated with said current region.

29. An apparatus for simulating topography of a conductive material in a semiconductor wafer, wherein a layout of the conductive material is subdivided into a plurality of regions, the apparatus comprising:
   a memory encoded with an area of a current region in said plurality of regions, the memory being further encoded with a plurality of dimensions of at least one object in the layout located at least partially within said current region;
   first means coupled to the memory to receive therefrom said layout, the first means further having an output port to supply thereon a parameter of said layout in said current region; and
   second means, coupled to said memory and further coupled to said output port of said first means, for determining a height of the conductive material based on assuming a predetermined structure comprising a feature in the conductive material located over a corresponding feature in an insulative layer, using at least said parameter, said area of said current region, and a measurement of the predetermined structure in a test wafer; and
   third means, coupled to the second means, for checking if the height satisfies a predetermined condition applicable to the predetermined structure.

30. The apparatus of claim 29 wherein said second means comprises:
   means for computing an effective surface area by multiplying the parameter with an effective trench depth obtained from the measurement;
   means for computing a layout density after changing widths of all objects in the layout in said current region by a predetermined amount by which a first width in the conductive material is expected to be differ from a second width in the insulative layer, said first width corresponding to said second width; and means for using said effective surface area and said layout density to compute said height.

31. The apparatus of claim 29 wherein:

said layout density is shrunk density $\rho_s$;

said predetermined amount is shrinkage amount $\delta_s$; and widths of all objects in the layout in said current region are reduced during said changing.

32. The apparatus of claim 29 wherein:

said layout density is expanded density $\rho_e$;

said predetermined amount is expansion amount $\delta_e$; and widths of all objects in the layout in said current region are increased during said changing.

33. A method of simulating topography of a conductive material in a semiconductor wafer, wherein a layout of the conductive material is subdivided into a plurality of regions, the method comprising:

encoding a memory with an area of a current region in said plurality of regions, and further encoding said memory with a plurality of dimensions of at least one object in the layout located at least partially within said current region;

receiving from the memory said layout and supplying a parameter of said layout in said current region;

determining a height of the conductive material based on assuming a predetermined structure comprising a feature in the conductive material located over a corresponding feature in an insulative layer, using at least said parameter, said area of said current region, and a measurement of the predetermined structure in a test wafer; and checking if the height satisfies a predetermined condition applicable to the predetermined structure, and if satisfied reporting the height.

34. The method of claim 33 further comprising:

computing an effective surface area by multiplying the parameter with an effective trench depth obtained from the measurement;

computing a layout density after changing widths of all objects in the layout in said current region by a predetermined amount by which a first width in the conductive material is expected to be differ from a second width in the insulative layer, said first width corresponding to said second width; and using said effective surface area and said layout density to compute said height.

35. The method of claim 34 wherein:

said layout density is shrunk density $\rho_s$;

said predetermined amount is shrinkage amount $\delta_s$; and widths of all objects in the layout in said current region are reduced during said changing.

36. The method of claim 34 wherein:

said layout density is expanded density $\rho_e$;

said predetermined amount is expansion amount $\delta_e$; and widths of all objects in the layout in said current region are increased during said changing.

* * * * *